US009729791B2

(12) United States Patent
Huerta et al.

(10) Patent No.: US 9,729,791 B2
(45) Date of Patent: Aug. 8, 2017

(54) MICRO CAMERA AND MULTI-PURPOSE MOUNTING BASE

(71) Applicant: Ubiquiti Networks, Inc., San Jose, CA (US)

(72) Inventors: Gerardo G. Huerta, San Jose, CA (US); Ming-Tsung Su, San Jose, CA (US)

(73) Assignee: UBIQUITI NETWORKS, INC., San Jose, CA (US)

( * ) Notice: Subject to any disclaimer, the term of this patent is extended or adjusted under 35 U.S.C. 154(b) by 4 days.

(21) Appl. No.: 14/921,920

(22) Filed: Oct. 23, 2015

(65) Prior Publication Data

US 2016/0127643 A1 May 5, 2016

Related U.S. Application Data

(60) Provisional application No. 62/073,892, filed on Oct. 31, 2014, provisional application No. 62/152,673, filed on Apr. 24, 2015.

(51) Int. Cl.
| | |
|---|---|
| *H04N 5/232* | (2006.01) |
| *H04N 5/225* | (2006.01) |
| *H01R 13/62* | (2006.01) |
| *H01F 7/02* | (2006.01) |

(Continued)

(52) U.S. Cl.
CPC ....... *H04N 5/23241* (2013.01); *H01F 7/0252* (2013.01); *H01F 38/14* (2013.01); *H01R 13/6205* (2013.01); *H01R 35/04* (2013.01); *H04N 5/2252* (2013.01); *H04N 5/2253* (2013.01); *H04N 5/23206* (2013.01)

(58) Field of Classification Search
None
See application file for complete search history.

(56) References Cited

U.S. PATENT DOCUMENTS

| | | | |
|---|---|---|---|
| 4,597,082 A | * | 6/1986 | Hill .................. H04B 3/56 375/222 |
| 4,719,549 A | | 1/1988 | Apel |

(Continued)

FOREIGN PATENT DOCUMENTS

| | | |
|---|---|---|
| DE | 202004017710 U1 | 2/2005 |
| DE | 102010040892 A1 | 3/2012 |

(Continued)

*Primary Examiner* — Mark T Monk
(74) *Attorney, Agent, or Firm* — Shun Yao; Park, Vaughan, Fleming & Dowler LLP

(57) ABSTRACT

A power connector facilitates mounting and repositioning an electronic device via a magnetic field. The power connector can include a receptacle surface comprising a curved surface operable to mate with a curved contact surface of an electronic device, and a device-coupling mechanism operable to hold the curved contact surface of the electronic device pressed against the curved surface of the power connector device, while an angle of the electronic device changes with respect to the power connector. The power connector can also include a power-transfer mechanism operable to transfer at least power to the electronic device, without an electrical wire between power connector and the electronic device, while the angle of the electronic device changes with respect to the power connector.

30 Claims, 30 Drawing Sheets

(51) Int. Cl.
*H01F 38/14* (2006.01)
*H01R 35/04* (2006.01)

(56) References Cited

U.S. PATENT DOCUMENTS

| | | | | |
|---|---|---|---|---|
| 5,995,763 | A * | 11/1999 | Posa | G02B 7/40 |
| | | | | 396/105 |
| 6,170,967 | B1 * | 1/2001 | Usher | F21V 23/06 |
| | | | | 200/227 |
| 6,183,263 | B1 | 2/2001 | Tacchi et al. | |
| 2002/0096956 | A1 * | 7/2002 | Erten | H02K 41/031 |
| | | | | 310/156.01 |
| 2003/0190825 | A1 * | 10/2003 | Sasaki | H01R 13/2421 |
| | | | | 439/66 |
| 2008/0013613 | A1 * | 1/2008 | Ahmad | H04L 12/2602 |
| | | | | 375/224 |
| 2009/0322278 | A1 | 12/2009 | Franks et al. | |
| 2013/0078855 | A1 * | 3/2013 | Hornick | H01R 13/73 |
| | | | | 439/571 |
| 2013/0328407 | A1 * | 12/2013 | Shimura | H02J 7/025 |
| | | | | 307/104 |
| 2014/0028525 | A1 * | 1/2014 | Ying | H01Q 1/243 |
| | | | | 343/893 |

FOREIGN PATENT DOCUMENTS

| | | | |
|---|---|---|---|
| GB | 381354 | A | 10/1932 |
| WO | 2005124944 | A1 | 12/2005 |

* cited by examiner

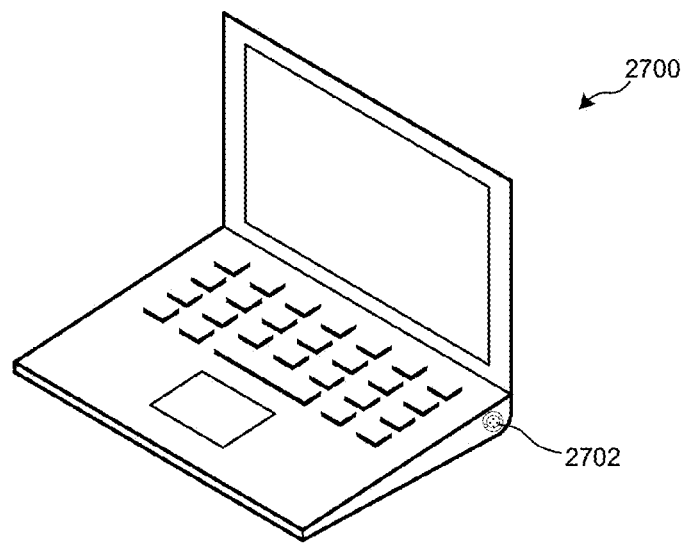
FIG. 27
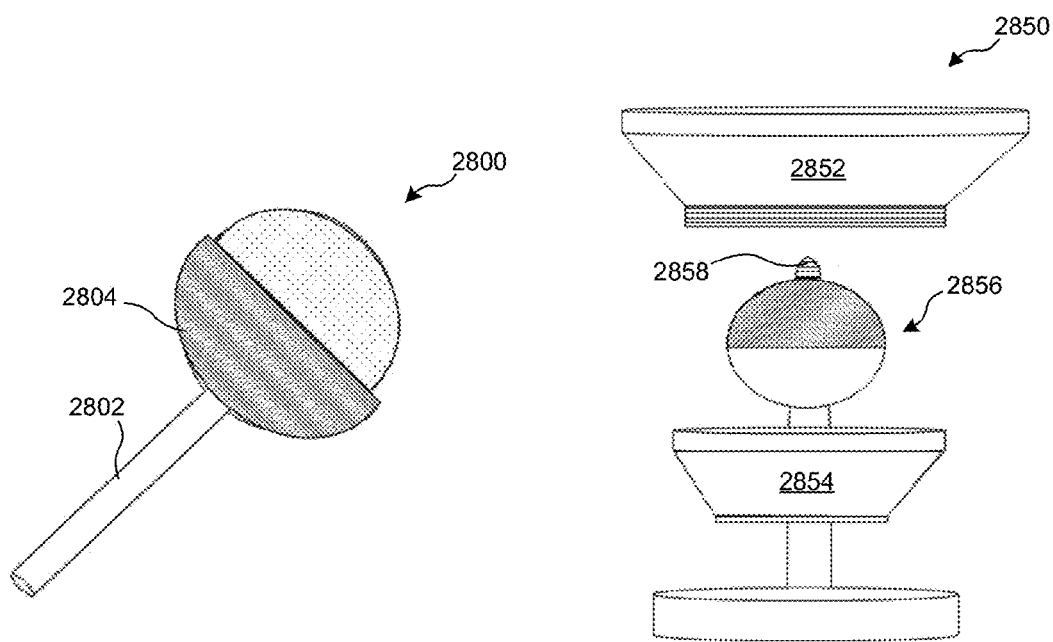
FIG. 28A  FIG. 28B

MICRO CAMERA AND MULTI-PURPOSE MOUNTING BASE

RELATED APPLICATION

This application claims the benefit of:
U.S. Provisional Application No. 62/073,892, entitled "Power Connector," by inventors Gerardo G. Huerta and Ming-Tsung Su, filed 31 Oct. 2014; and
U.S. Provisional Application No. 62/152,673, entitled "POWER CONNECTOR," by inventors Gerardo G. Huerta and Ming-Tsung Su, filed 24 Apr. 2015,
the disclosures of which are incorporated herein in their entirety.

BACKGROUND

Field

This disclosure is generally related to a power connector. More specifically, this disclosure is related to a receptacle which facilitates mounting an electronic device on the receptacle via a magnetic field.

Related Art

Consumer and commercial electronic devices oftentimes receive direct current (DC) power from an external power supply which transforms a conventional alternating current (AC) power supply to a DC power signal that meets the electronic device's power requirements. Oftentimes, the power supply includes a power plug at one end that connects to a conventional two-prong or three-prong power outlet, and includes a connector at an opposing end that inserts into the electronic device to provide power to the electronic device.

For example, the connector may include a male plug that inserts into a female connector in one of only one or two possible orientations. The electronic device can include a housing for the female connector that applies friction onto the male connector, to secure the male connector into the electronic device. The female connector can also include a set of electrical contacts that mate with a corresponding set of contacts of the male connector. Oftentimes, both the female connector's housing and its electrical contacts, individually or in concert, may be designed to fasten the male connector into the female connector. In some connectors, such as in D-subminiature connectors, the housings of the male and female connectors are screwed together, which restricts the physical connection to a single orientation.

Unfortunately, this robust physical connection between the male and female connectors effectively restricts the possible orientations in which the male and female connectors can mate.

Some power adapters attempt to provide additional flexibility by including fixed external prongs which may be inserted into sockets in wall outlets or power strips, and including a rotatable electrical socket that allows an external device's power cable or power supply to rotate while plugged into the rotatable electrical socket. However, the rotatable socket only allows one freedom along a rotational axis. A user is not able to adjust an angle on which a device is plugged onto the rotatable socket to an off-axis angle.

Moreover, the rotatable electrical socket is typically electrically connected to the fixed external prong via a set of electrical wires, which restricts the amount of rotation that one can perform on the rotatable socket. If a user over-rotates the rotatable socket, the user will reach torsion resistance from the electrical wires. If the user induces too much torsion on the electrical wires, the user risks breaking the electrical wire or causing the electrical wires to become decoupled from the fixed external prongs or the rotatable socket.

In another example, magnetic power connectors have been used to replace the need for prongs in a conventional AC power supply, thereby reducing the need for fine alignment. A magnetic connector may include a magnetic surface and an electrical connector which may mate with an electrical connector of a cable, and a housing which aligns the electrical connectors between the power connector and the external cable. The magnetic surfaces of the mated connectors are typically chosen to have a strong force holding the two magnetically attracted halves together, and so the two magnetically attracted halves may therefore be quite large. The magnetic connectors are typically configured so that the housing and the electrical connectors restrict lateral and radial movement of the connectors to maintain the orientation needed for electrical conductivity.

SUMMARY

One embodiment provides a power connector that facilitates mounting and repositioning an electronic device. The power connector can include a curved receptacle surface comprising a surface that forms a semi-sphere and can mate with a curved contact surface of an electronic device. The power connector and/or the electronic device can include a device-coupling mechanism that can maintain the curved contact surface of the electronic device pressed against the curved receptacle surface of the power connector device, while an angle of the electronic device changes with respect to the power connector. The power connector and/or the electronic device can also include a power-transfer mechanism that can transfer at least power from the power connector to the electronic device, without an electrical wire between the power connector and the electronic device, while the angle of the electronic device changes with respect to the power connector.

In some embodiments, the device-coupling mechanism does not mechanically fasten the electronic device to the power connector.

In some embodiments, the device-coupling mechanism can include a magnet on the power connector that emits a magnetic field. Moreover, the device-coupling mechanism can include a magnetically-sensitive material on the electronic device, such that the magnetically-sensitive material is attracted to the magnetic field emitted by the magnet on the power connector.

In some embodiments, the device-coupling mechanism can include an electromagnet on the power connector, and a magnetically-sensitive material on the electronic device. The electromagnet can emit a magnetic field when a current passes through the electromagnet, and the magnetically-sensitive material is attracted to the magnetic field emitted by the electromagnet on the power connector.

In some embodiments, the receptacle surface comprises one or more of a concave curved surface, and a convex curved surface.

In some embodiments, the power connector can include a magnet that emits a first magnetic field that attracts the electronic device to the receptacle surface of the power connector, and can also include an electromagnet which, when a current passes through the electromagnet, emits a second magnetic field that increases the magnetic attraction between the power connector apparatus and the electronic device.

In some variations to these embodiments, the second magnetic field is sufficiently strong to deter a malicious entity from detaching the electronic device from the power connector apparatus.

In some embodiments, the magnetic field is emitted by the electronic device, and the magnetic-attraction device includes a magnetically-sensitive material that is attracted to a magnetic field emitted by the electronic device.

In some embodiments, the power-transfer mechanism comprises at least two contacts on the receptacle surface that can transmit power to the electronic device over at least two corresponding contacts on the contact surface of the electronic device.

In some variations on these embodiments, the signal-transfer mechanism is further operable to exchange data signals with the electronic device via the at least two conduction surfaces that are further operable to transmit and receive data signals on top of a power signal.

In some variations on these embodiments, the signal-transfer mechanism is further operable to exchange data signals with the electronic device via one or more additional contacts on the receptacle surface of the power connector and the contact surface of the electronic device.

In some variations on these embodiments, the at least two contacts include one or more of: a contact pin at the center of the curved receptacle surface or the curved contact surface; a conduction surface at a center portion of the curved receptacle surface or the curved contact surface; a contact pin at an off-center position of the curved receptacle surface or the curved contact surface; and a conduction surface forming a circular ring on the curved receptacle surface or the curved contact surface.

In some embodiments, the power-transfer mechanism comprises a primary inductive coil, operable to induce a current on a secondary inductive coil of the electronic device.

In some embodiments, when the electronic device is mounted on the power connector apparatus, the primary inductive coil at least partially surrounds the secondary inductive coil of the electronic device.

In some embodiments, the power connector can include an actuator operable to adjust an orientation of the electronic device relative to the power connector apparatus.

In some embodiments, the actuator can include a wheel mounted on the curved receptacle surface of the power connector. When the electronic device is mounted on the power connector apparatus, the wheel may come in contact with the curved contact surface of the electronic device.

In some embodiments, the power connector includes a peer-to-peer communication interface with the electronic device, and receives a command from the electronic device to activate the actuator.

In some embodiments, the actuator can include a wheel mounted on the power connector, such that the wheel is in contact with a contact surface of the electronic device. The power connector can activate the actuator to rotate the wheel, which causes the orientation of the electronic device to change along the determined direction.

In some embodiments, the actuator includes a magnet mounted on the power connector, which emits a magnetic field to attract a device-side on the electronic device toward the magnet on the power connector. When the power connector activates the actuator, the actuator moves the magnet on the power connector along the determined direction to cause the magnetic field to attract the device-side magnet to a new position along the determined direction.

In some embodiments, the actuator can be mounted on the electronic device, and the power connector can activate the actuator by sending a signal to the electronic device. The electronic device can respond to the signal by activating the actuator to adjust the orientation of the electronic device along the determined direction.

BRIEF DESCRIPTION OF THE FIGURES

FIG. 27 illustrates an exemplary portable computing device comprising a connector base in accordance with an embodiment.

FIG. 28A illustrates an exemplary connector head on a cable in accordance with an embodiment.

FIG. 28B illustrates an exploded view of an exemplary connector head with a threaded perimeter in accordance with an embodiment.

In the figures, like reference numerals refer to the same figure elements.

DETAILED DESCRIPTION

Figure 1:
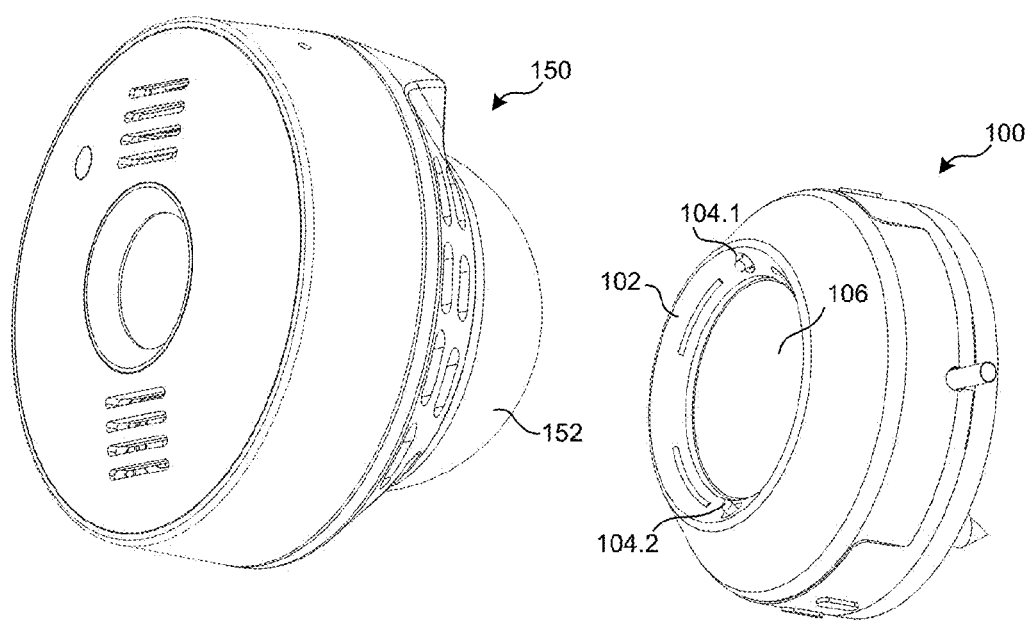
FIG. 1 illustrates an exemplary connector base and a camera head in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a micro camera and power connector that solve the problem of adjusting a directional angle and/or a rotational angle of the camera mounted on a surface of the power connector. The connector base can serve as a device mount and power source for various types of devices that can be mounted on the connector base. For example, the camera head can be mounted on a surface of the connector base, and can remain coupled to the connector base via a magnet on the connector base (or on the camera head). The coupling section can be curved (e.g., half a sphere), which may allow the camera head to be repositioned along the coupling section.

In some embodiments, the micro camera can be detachably coupled to the power connector through a ball-and-socket joint. For example, neither the connector base nor the camera head may include a locking mechanism that clamps onto or otherwise fastens the camera head onto the connector base. Hence, it may be possible for a user to remove the camera head from the connector base by pulling on the camera head, and to mount another electrical or electronic device on the connector base by placing the back end of the device in contact with the curved region of the connector base.

Hereinafter, exemplary uses of the connector base are described with respect to the camera head. However, the connector base is a standalone device that can be used to mount, and provide power and/or network connection to any electrical or electronic device, such as a power outlet, a sensor (e.g., a motion sensor, a light sensor, a microphone, etc.), a combination of sensors, a smoke detector, a carbon-monoxide detector, a digital thermostat, a light dimmer or switch, a video display, a microphone, a projector (e.g., a laser or high-intensity LED projector head), a keypad, a Wi-Fi access point, etc.

Moreover, a major advantage of the connector base is that it may allow a user to swap components mounted on the connector base. For example, the user can remove a device mounted on the connector base by pulling on the mounted device with sufficient force to overcome the magnetic force produced by the connector base onto the curved surface of the mounted device. Then, to mount another device to the connector base, the user just needs to place the curved surface of the device (e.g., a metallic material) near or in contact with the curved mounting surface of the connector base. The magnetic field emitted by the connector base can attract and hold the device in a mounted position on the connector base.

Another major advantage of the connector base is that it can allow the user to mount the device onto the connector base in any rotational orientation, as well as a wide variety of angular orientations along the receptacle surface of the connector base. Hence, the connector base allows the electronic device to have three degrees of freedom while mounted on the connector base: pan, tilt, and rotation. In some embodiments, the receptacle surface can be a curved surface (e.g., a half-sphere concave surface). The user can select the rotational and angular orientation when mounting the device onto receptacle surface of the connector base, and can adjust the rotational and/or angular orientation at any time while the device is mounted on the connector base, without discontinuing power to the device.

FIG. 1 illustrates an exemplary connector base 100 and a camera head 150 in accordance with an embodiment. Connector base 100 can provide power to camera head 150 via a set of contact pins 104.1 and 104.2 and a contact surface 106 on a receptacle surface 102 (e.g., a direct current (DC) power signal, or an alternating current (AC) power signal), or via inductive coupling between connector base 100 and camera head 150. Camera head 150 can include a contact pin (not shown) and a contact surface 152 which can mate with contact surface 106 and contact pins 104.1-104.2 of connector base 100. In some embodiments, a contact pin can include a spring-biased pin that retracts as contact surface 152 mates with receptacle surface 102.

In some other embodiments, camera head 150 can include a Wi-Fi radio, which camera head 150 can use to receive a network connection via any Wi-Fi access point. Hence, camera head 150 can receive power from connector base 100, and can use a network connection to any Wi-Fi access point to send a live video and/or audio feed to a network video recorder (NVR). The NVR can be any network-connected server computer, which may be configured to record a video stream from camera head 150, and/or one or more other Internet Protocol (IP) cameras.

In some embodiments, connector base 100 can be network-connected, for example, via a Wi-Fi signal, or via an Ethernet or USB connection. Connector base 100 can transmit a network connection to the camera head as a modulated signal on top of the power signal (e.g., over the power pins, or the induction coil), over a dedicated set of network-carrying contact pins, or over a wireless signal (e.g., Wi-Fi, Bluetooth, etc.). For example, connector base 100 can receive power and a network connection via a Power-over-Ethernet (PoE) cable. Connector base 100 can relay power from the PoE cable to a device mounted on the connector base (e.g., camera head 150) via contact pins on the connector base and the device. The connector base can also relay a network signal from the PoE cable to the mounted component over dedicated data contact pins, or over its power contact pins that carry data signals modulated over an alternating current (AC) power signal.

In some embodiments, connector base 100 can also include a processor and a set of actuators that can adjust the direction of camera head 150. Connector base 100 can receive commands that control the actuator over a computer network, or from camera head 150 itself. The processor can process and execute these commands or instructions, which can cause connector base 100 to activate the actuators to adjust the direction of camera head 150. In some embodiments, the actuators can control one or more wheels along receptacle surface 102 of connector base 100 that may adjust the direction and/or rotation angle of camera head 150. In some other embodiments, the actuators may move an adjustable magnet in connector base 150, which can adjust the direction that camera head 150 faces by attracting a magnet in camera head 150 toward the magnet in connector base 100.

Exemplary Computing Environments

In some embodiments, an NVR can record video from multiple camera heads. For example, a plurality of connector base components can be installed in a room or area to facilitate deploying various types of adjustable electrical or electronic components for this room or area. Some of these connector base components can be used to deploy multiple camera heads that each streams a live video stream to the NVR over a computer network. Other connector base components can be used to deploy luminaires, laser lights, projectors, etc.

Figure 2A:
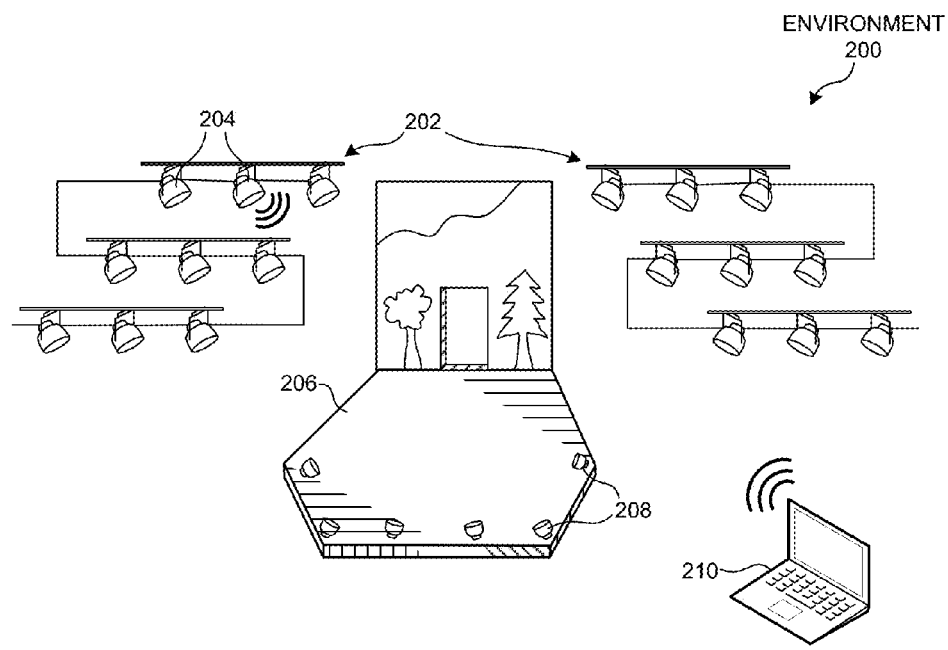
FIG. 2A illustrates an exemplary environment in which multiple connector base components are used to deploy computer-controlled devices for a live performance event in accordance with an embodiment.

FIG. 2A illustrates an exemplary environment 200 in which multiple connector base components are used to deploy computer-controlled devices for a live performance event in accordance with an embodiment. A theater stage can include multiple rails 202 overhead that each includes multiple connector base components 204. Also, the theater floor 206 can include multiple connector heads 208 deployed across the floor perimeter. A stage designer can remove components that were previously installed across connector base components 202 and 208 for a previous show, and can replace them with whichever electrical or electronic components the stage designer needs for an upcoming show.

For example, a stage designer can use multiple of these connector base components to install stage lighting, by installing a device head that includes a luminaire (e.g., a stage light). Recall that a connector base can include an actuator that can adjust a direction of a device head. Hence, the stage designer can use a computer 210 to control the direction of each stage light by adjusting the actuator position for each corresponding connector base. The stage designer can use computer 210 to either manually adjust the direction of each stage light, or can create one or more scripts that can pre-program how computer 210 is to automatically (e.g., without user intervention) move the stage lights during a live theater event.

The stage designer can also use various connector base components to deploy camera heads that are to record or stream the live theater event, or that allow the stage designer and/or the director to inspect the live theater event from various viewpoints throughout the theater. The stage designer can use these video feeds to adjust the stage lighting. The director can use these video feeds to ensure the actors can be seen and heard clearly from various corners of the theater, and can instruct the actors to adjust their performance accordingly.

In some embodiments, the stage designer can use various connector base components to deploy camera heads that facilitate the stage designer to adjust the lighting configuration during the live theater event. For example, the stage designer can cluster one or more lights into a lighting group, and can deploy a camera head for each lighting group to track the lighting for the lighting group. Then, during the live theater event, the stage designer can use computer 210 to inspect the portion of the stage that is being covered by each lighting group. If the stage designer is manually controlling the lighting, the stage designer can use the video feed from a lighting group to redirect the lights and camera head of the lighting group to track the actors as they move on-stage. On the other hand, if the stage designer has created a script that automatically adjusts the direction for each lighting group as a sequence of timed events, the stage designer can inspect the camera feed from each lighting group to verify that the timed script is aligned with the live theater event, and to correct any spatial and/or temporal misalignments between the timed script and the live theater event.

Figure 2B:
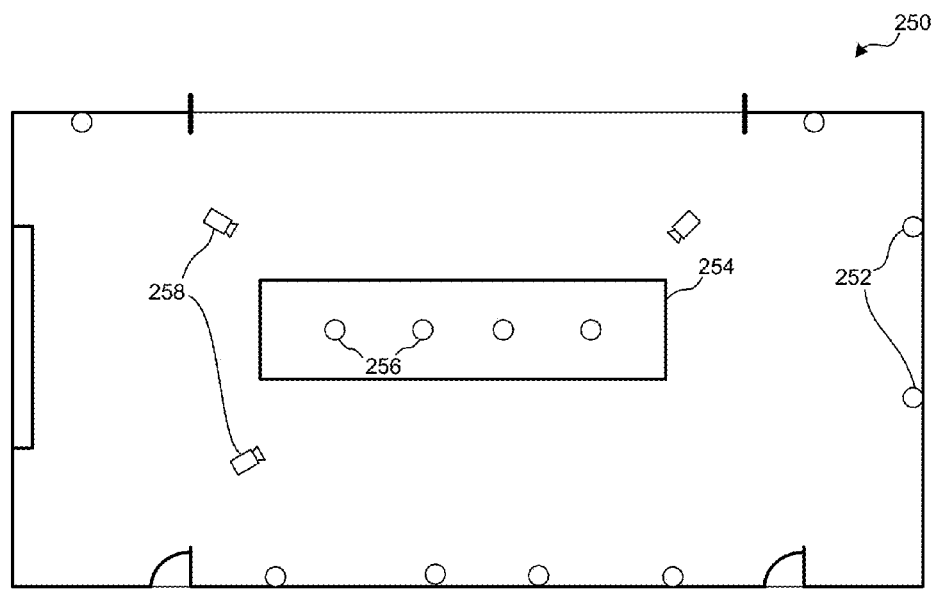
FIG. 2B illustrates an exemplary environment in which multiple electrical connectors are used to deploy cameras and other electronic devices for an office or conference room in accordance with an embodiment.

FIG. 2B illustrates an exemplary environment 150 in which multiple electrical connectors are used to deploy cameras and other electronic devices for an office or conference room in accordance with an embodiment. The conference room walls can include a plurality of connector base components 252 that can accommodate various electrical and electronic components. For example, a subset of connector base components 252 can be used to install permanent light fixtures, or to install temporary light fixtures that add additional lighting into the conference room (e.g., directed lighting that directs light toward the conference room table or a whiteboard).

Other connector base components can include a set of network-connected sensors that can measure various ambient characteristics of the room and can perform a pre-programmed action that corresponds to each detected event. Some exemplary sensors can include but are not limited to a digital thermometer, a motion detector, a proximity sensor, a microphone or ambient-sound detector, a smoke detector, a carbon-monoxide sensor, etc. A user can add or remove sensors to/from the room by pulling unwanted sensors out of their respective connector base, and inserting any necessary sensors into the appropriate connector base components. Moreover, the user can adjust the directionality of a sensor to a specific section of the room either locally (e.g., by manually adjusting the direction of a sensor) or remotely (by programming a computer or operating the computer to adjust the actuators of a respective connector base or sensor to effectively adjust the direction of the sensor).

In some embodiments, the user can also install an electronic component into a wall-mounted connector base, such as to move a digital thermostat from one room into another, or to add a light switch to a room. This allows an organization to purchase a minimal number of electronic components that are seldom used, or that should only be used by a set of authorized personnel. For example, a building manager can discourage unauthorized use of a conference room by removing all light switches that are otherwise installed in one or more connector base components throughout the conference room. Also, the building manager can prevent others from altering the temperature within a room by not installing a digital thermostat in the room. However, if a set of top executives are planning to use the conference room, the building manager can install the digital thermostat for their convenience by placing the digital thermostat in any connector base within the room.

In some embodiments, a conference table 254 itself can include one or more connector base components 256, which can be used to deploy any electrical or electronic components that need to be in close proximity to conference participants. For example, a conference organizer or building manager can use table-top connector base components 256 to deploy a set of power outlets, powered USB hubs, light switches or dimmers, projector controllers, etc.

Moreover, several connector base components within the conference room can be used to deploy a camera head for each remote attendee that plans to video conference into a meeting. These connector base components may exist on the conference table, on a wall, near the conference table (e.g., connector base components 258) or anywhere else in the conference room. A remote attendee can use software running on his computer, or otherwise accessed by his computer from a server, to control a camera head and to receive an audio and video feed from the camera head. For example, the user can use his computer to pan, tilt, and/or zoom a camera head assigned to the user. In some embodiments, a connector base can include other devices that the user may want to control during a meeting. For example, the connector base can include an actuator, and can be used to deploy a directional microphone, a laser pointer, or any other video-conference or presentation tool that the user may wish to control remotely.

Figure 3A:
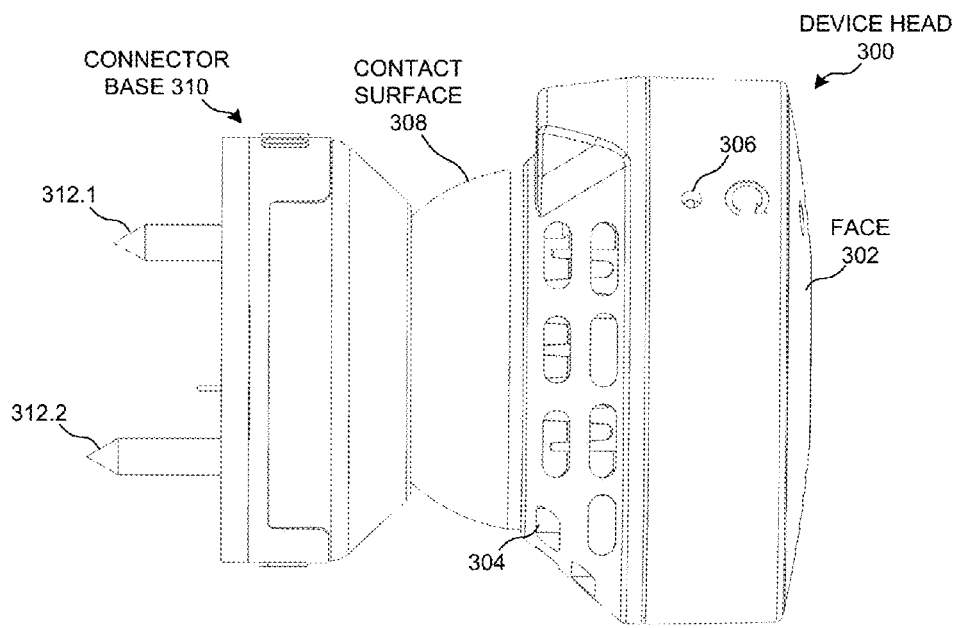
FIG. 3A illustrates a camera head mounted on a connector base in accordance with an embodiment.

FIG. 3A illustrates a camera head 300 mounted on a connector base 310 in accordance with an embodiment. Connector base 310 can include holes for one or more screws 312.1-312.2 to mount connector base 310 onto a flat surface, such as a wall or a ceiling. Camera head 300 can include a contact surface 308 for receiving power from connector base 310, and can include a face 302 comprising at least a lens for an image sensor. Camera head 300 can also include a set of vents 304 that allow airflow to cool circuitry of camera head 300, and a reset button 306 that resets camera head 300 to a set of default configuration parameters.

Figure 3B:
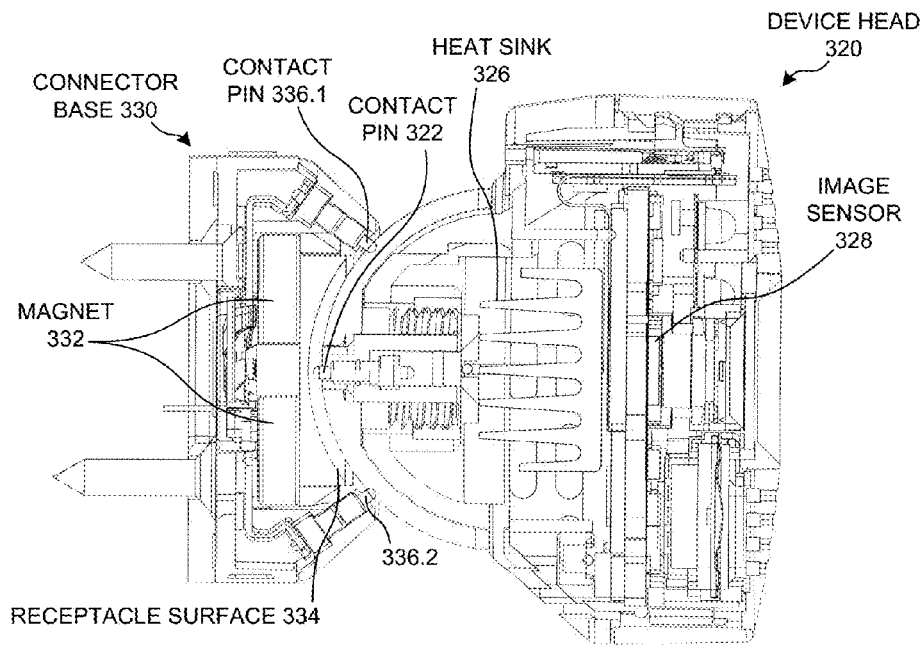
FIG. 3B illustrates a cross-section of the camera head mounted on a connector base in accordance with an embodiment.

FIG. 3B illustrates a cross-section of a camera head 320 mounted on a connector base 330 in accordance with an embodiment. Connector base 330 can include a magnet 332 (e.g., a permanent magnet) which can emit a magnetic field that affects (attracts) a contact surface 324 of camera head 320. The magnetic field emitted by magnet 332 may include sufficient force to overcome the effect of gravity on camera head 320, thus retaining camera head 320 mounted on connector base 330.

The cross-section of camera head 320 and connector base 330 illustrate a contact pin 322 on camera head 320 making contact with receptacle surface 334 when mounted on connector base 330. Contact pin 322 can include a spring-biased pin that can remain in electrical contact with receptacle surface 334 on connector base 330, even as the rotational or directional orientation of camera head 320 is adjusted. Contact surface 324 of camera head 330 can also include an isolation ring surrounding contact pin 322. This isolation ring may be non-conductive, and can isolate contact pin 322 from the conductive material of contact surface 324 of camera head 320.

Connector base 330 can also include a set of contact pins 336.1-336.2 (e.g., a spring-biased pin), which can make contact with a contact surface of device head 320 when device head 320 is mounted on connector base 330. Connector base 330 can transmit at least a power signal to device head 320 by using each of receptacle surface 334 and contact pins 336.1-336.2 as a terminal for the power signal. In some embodiments, connector base 330 can transmit a wireless power signal to device head 320 via inductive coupling, and can use each of receptacle surface 334 and contact pins 336.1-336.2 as data terminals for sending and/or receiving data to/from device head 320.

Figure 3C:
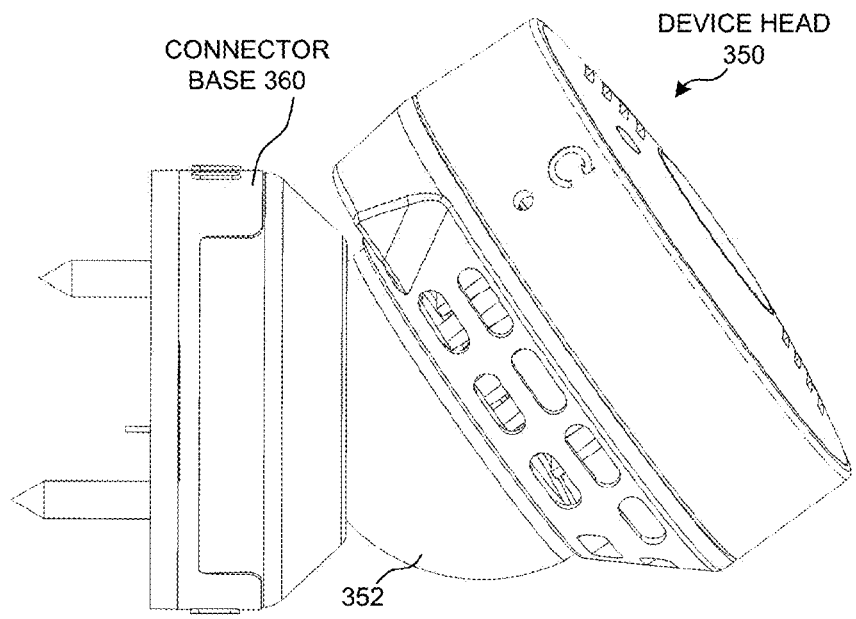
FIG. 3C illustrates a camera head mounted at an angle on a connector base in accordance with an embodiment.

FIG. 3C illustrates a camera head 350 mounted at an angle on a connector base 360 in accordance with an embodiment. A contact surface 352 of camera head 350 can remain mounted on (and in contact with) a receptacle surface of connector base 360 when the direction of camera head 350 is adjusted while mounted on connector base 360.

Figure 3D:
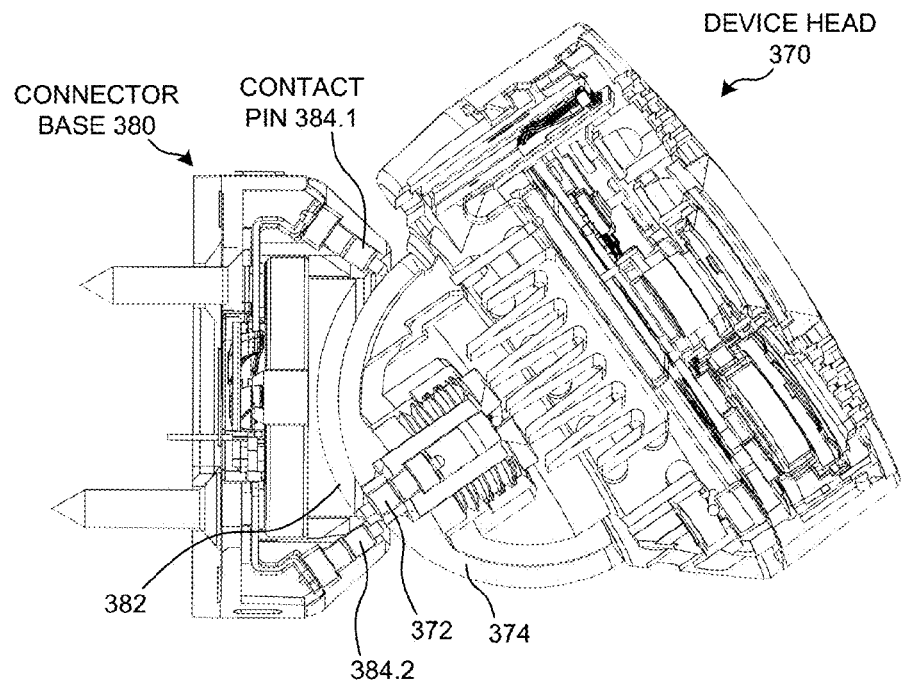
FIG. 3D illustrates a cross-section of a camera head mounted at an angle on a connector base in accordance with an embodiment.

FIG. 3D illustrates a cross-section of a camera head 370 mounted at an angle on a connector base 380 in accordance with an embodiment. Specifically, a contact pin 372 of camera head 370 remains in contact with a receptacle surface 382 of connector base 380, even as a user adjusts the angular orientation and direction of camera head 370. Moreover, connector base 380 can include one or more contact pins 384.1-384.2 (e.g., spring-biased pins) that can remain in contact with a contact surface 374 of camera head 370 as the user adjusts the angular orientation and direction of camera head 370.

Connector Base

Figure 4:
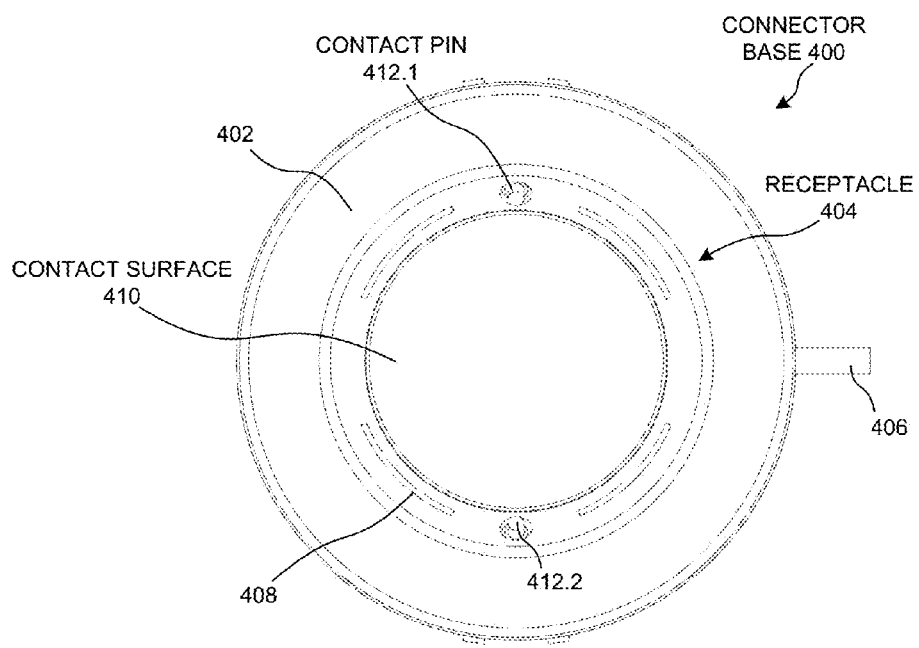
FIG. 4 illustrates a front view of a connector base in accordance with an embodiment.

FIG. 4 illustrates a front view of a connector base 400 in accordance with an embodiment. Connector base 400 includes a chassis 402, a receptacle 404, and a cable 406. Receptacle 404 can include a set of spacers 408 that separate a contact surface 410 of receptacle 404 from a contact surface of a mounted device. Moreover, receptacle 404 can include a set of contact pins 404 that make contact with the contact surface of the mounted device. In some embodiments, contact surface 410 and contact pins 412 of receptacle 404 can provide a set of terminals that provide power and/or a data signal to the mounted device. The power signal can include a direct current (DC) power signal or an alternating current (AC) power signal. Contact pins 412 remain in contact with the contact surface of the mounted device, even as a user adjusts the angular or rotational orientation of the device.

Figure 5:
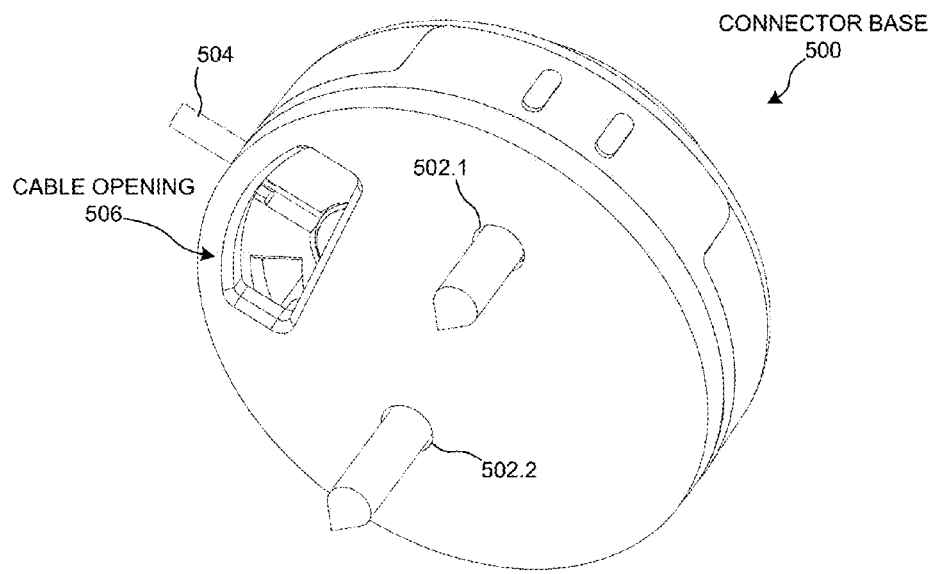
FIG. 5 illustrates an angled view of a connector base in accordance with an embodiment.

FIG. 5 illustrates an angled view of a connector base 500 in accordance with an embodiment. The bottom surface of connector base 500 can include a set of screw holes 502, and connector base 500 can include an electrical cable 504 that provides power and/or a data signal to connector base 500. A user can use one or more of screw holes 502.1 and 502.2 to mount connector base 500 on a flat surface. In some embodiments, cable 504 can pass through a side opening (not shown) on a side surface of connector base 500, or through a cable opening 506 on the rear surface of connector base 500. For example, the user can pass cable 504 through cable opening 506 when installing connector base 500 on an external mounting surface such as a wall to conceal cable 504 inside the mounting surface. Keeping electrical cable 504 out of sight can prevent a malicious entity from tampering with cable 504, and can result in a more aesthetically pleasing installation. Alternatively, the user can pass cable 504 via the side opening when it is not possible to conceal cable 504 within the mounting surface.

Figures 6A, 6B:
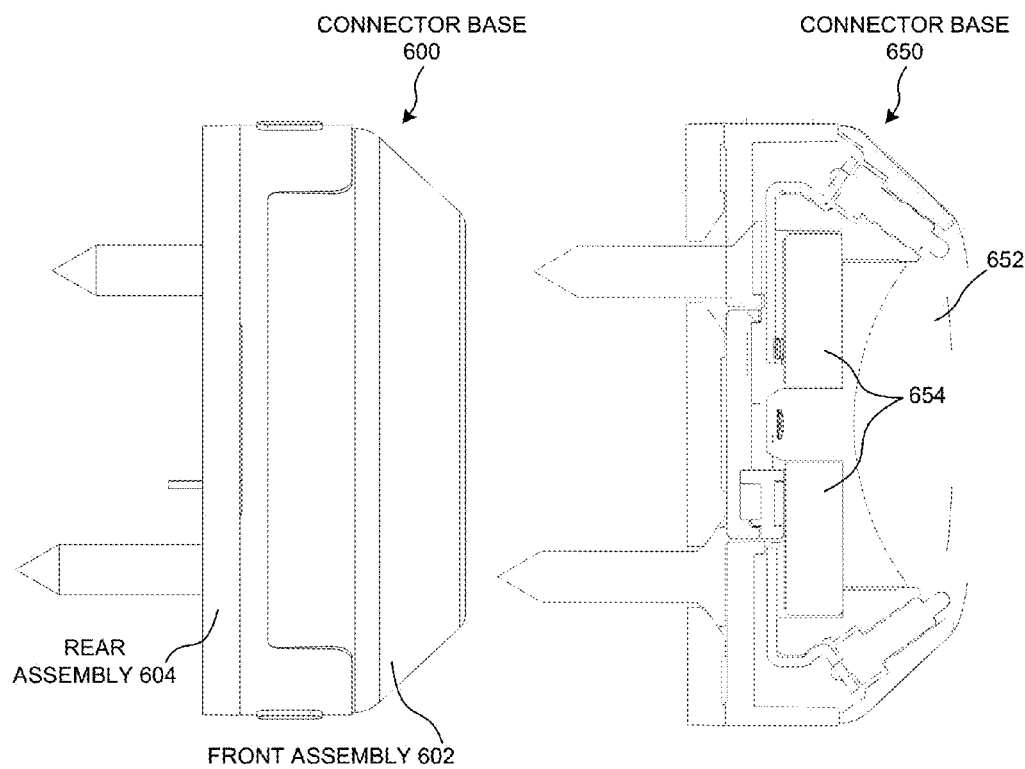
FIG. 6A illustrates a side view of a connector base in accordance with an embodiment.
FIG. 6B illustrates a cross-section of a side view of a connector base in accordance with an embodiment.

FIG. 6A illustrates a side view of a connector base 600 in accordance with an embodiment. Connector base 600 can include a front assembly 602 and a rear assembly 604 that may be manufactured as separate components. Front assembly 602 can snap onto rear assembly 604 for a fast, simple, and low-cost assembly of connector base 600.

FIG. 6B illustrates a cross-section of a side view of a connector base 650 in accordance with an embodiment. Specifically, connector base 650 can include a receptacle 652, and a magnet 654 for mounting a device on receptacle 652.

Device Head

Figure 7:
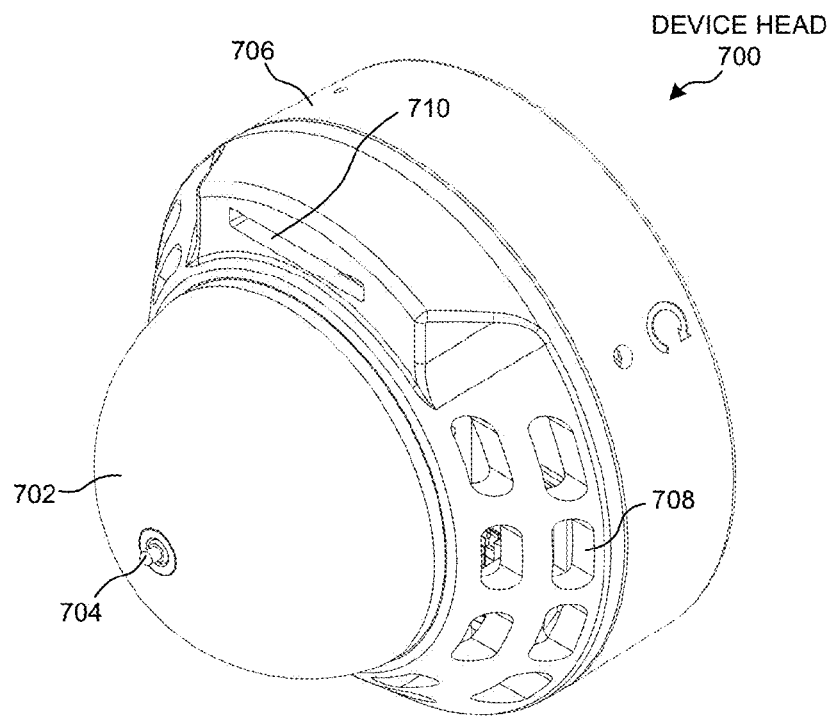
FIG. 7 illustrates a side view of a device head in accordance with an embodiment.

FIG. 7 illustrates a side view of a device head in accordance with an embodiment. In some embodiments, device head 700 includes a camera head that can capture images and sound using a built-in image sensor and microphone, and can stream the captured audio and video to a remote device, such as a video recorder or a personal computing device. Camera head 700 can also include a memory card reader 710, which can be used to store images, video, and/or audio captured by camera head 700.

In some embodiments, contact surface 702 can include a metallic material that can be affected by (attracted to) the magnetic field emitted by the connector base. Also, contact surface 702, along with a connector pin 704, can function as a pair of terminals for receiving power from the connector base. Moreover, a front assembly 706 of device head 700 can include a set of large vents 708 that allows heat to dissipate from a heat sink inside device head 700 onto an external environment. The heat sink can dissipate heat away from an image sensor, a microprocessor, and/or a wireless radio (e.g., a Wi-Fi radio).

Device head 700 can include a wireless network interface for accessing a computer network from an access point. In some other embodiments, the camera head can include a wired network interface that connects to the network via contact pins on the connector base (e.g., via terminals 702 and 704, or via dedicated network pins). For example, the connector base can receive power and a network connection via a Power-over-Ethernet (PoE) cable. The connector base can relay power from the PoE cable to device head 700 (e.g., a camera head) via contact pins on the connector base and device head 700. The connector base can also relay a network signal from the PoE cable to device head 700 over dedicated data contact pins, or over its power contact pins that carry data signals modulated over an alternating current (AC) power signal.

Moreover, the connector base can include a wired or wireless peer-to-peer network interface that allows the connector base to receive commands from device head 700 (e.g., via a data signal transmitted over contact pins, a data signal modulated over the power line, a Bluetooth interface, etc.). Device head 700 can receive movement commands from a remote computer, and can issue these commands to the connector base via the peer-to-peer network interface between the camera head and the connector base. Hence, the connector base can be controlled remotely to adjust the direction of device head 700 without implementing the connector base as a network-capable device. This allows the connector base to be a low-cost component with minimal processing capabilities, which receives basic motion commands from the camera head over a simple peer-to-peer data signal.

Figure 8:
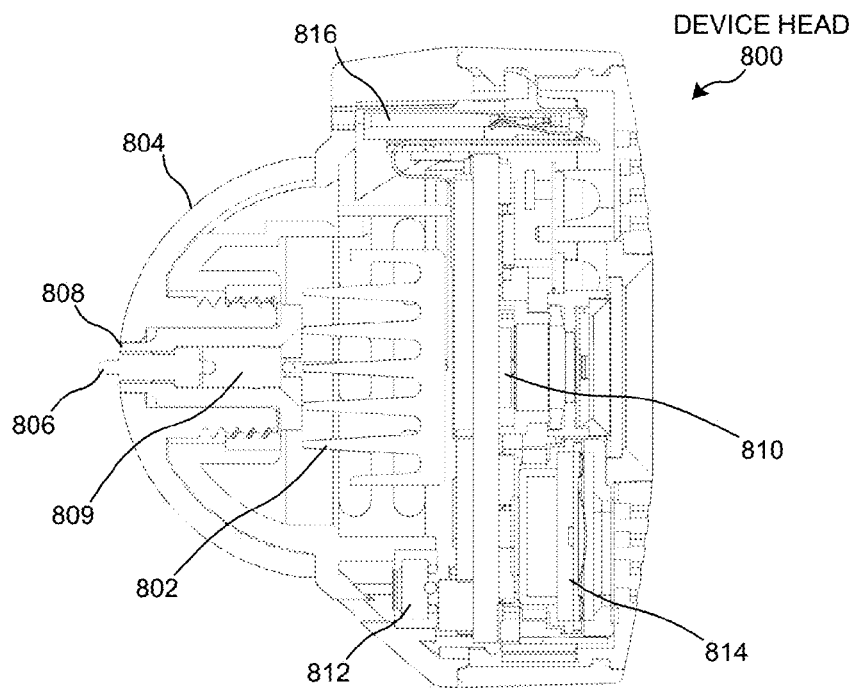
FIG. 8 illustrates a cross section of a device head side view in accordance with an embodiment.

FIG. 8 illustrates a cross section of a device head 800 side view in accordance with an embodiment. Specifically, device head 800 includes a large heat sink 802, coupled to the top side or back side of one or more circuit components of device head 800 (e.g., the back side of an image sensor, processor, and/or wireless (e.g., Wi-Fi) radio components). Heat sink 802 transfers heat away from the circuit components and toward the vents on the back side of the device head, where the heat radiates out through the vents toward an exterior environment.

Device head 800 can also include a contact surface 804 and at least one contact pin 806 for receiving a power and/or data signal from a connector base. Contact pin 806 can be spring-loaded, and can retract into contact pin chamber 809 when device head 800 is mounted on a connector base (at which point contact pin 806 may become pressed against a contact surface of the connector base). An insulation layer 808 can separate contact surface 804 from contact pin 806.

In some embodiments, device head 800 may correspond to a closed circuit television (CCTV) camera comprising an image sensor 810 that can capture images and/or video, and a microphone 812 that can capture audio, and can also comprise a speaker 814 that can allow a user to communicate with others near device head 800. Device head can also include a memory card reader 816 for storing and accessing the captured images, audio, and/or video.

Figure 9A:
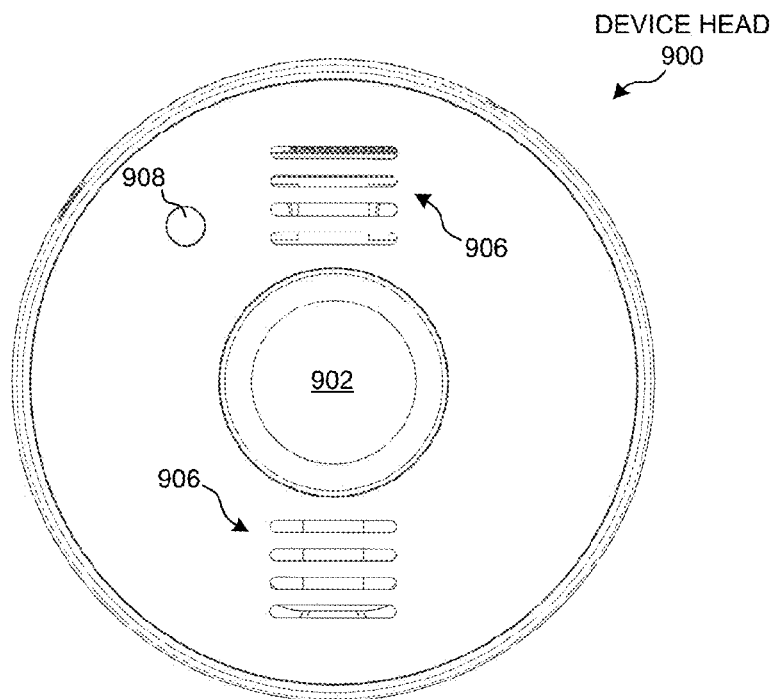
FIG. 9A illustrates a front view of a camera head in accordance with an embodiment.

FIG. 9A illustrates a front view of a camera head 900 in accordance with an embodiment. Specifically, camera head 900 can include an image sensor 902, an infrared (IR) emitter 904, a speaker box 906, and a light pipe 908. In some embodiments, image sensor 902 can capture images of a physical area or person in front of camera head 900, and infrared emitter 904 can emit an infrared light that allows image sensor 902 to capture images in a dark or low-light environment. Also, a user can use a personal computer to view a video stream from camera head 900, and can use speaker box 906 to speak directly to a person in front of or near camera head 900.

Figure 9B:
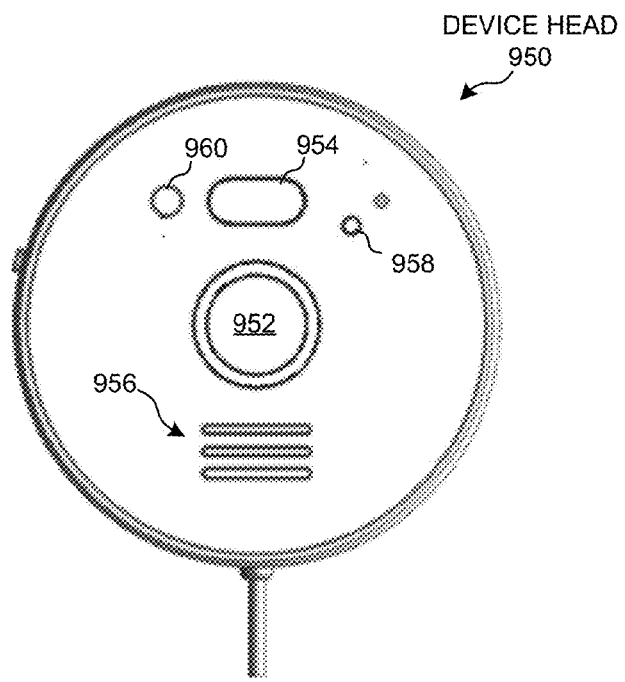
FIG. 9B illustrates a front view of an alternative implementation of a camera head in accordance with an embodiment.

FIG. 9B illustrates a front view of an alternative implementation of a camera head 950 in accordance with an embodiment. Specifically, camera head 950 can include an image sensor 952, an infrared (IR) emitter 954, a speaker box 956, a microphone 958, and a light pipe 960. In some embodiments, camera head 950 can generate a video stream that includes images captured by image sensor 952, and includes audio captured by microphone 958. A user can use a personal computer to supervise an audio and video stream from camera head 950, and can use microphone 958 and speaker box 956 to carry a conversation with a person in front of or near camera head 950.

Figure 10:
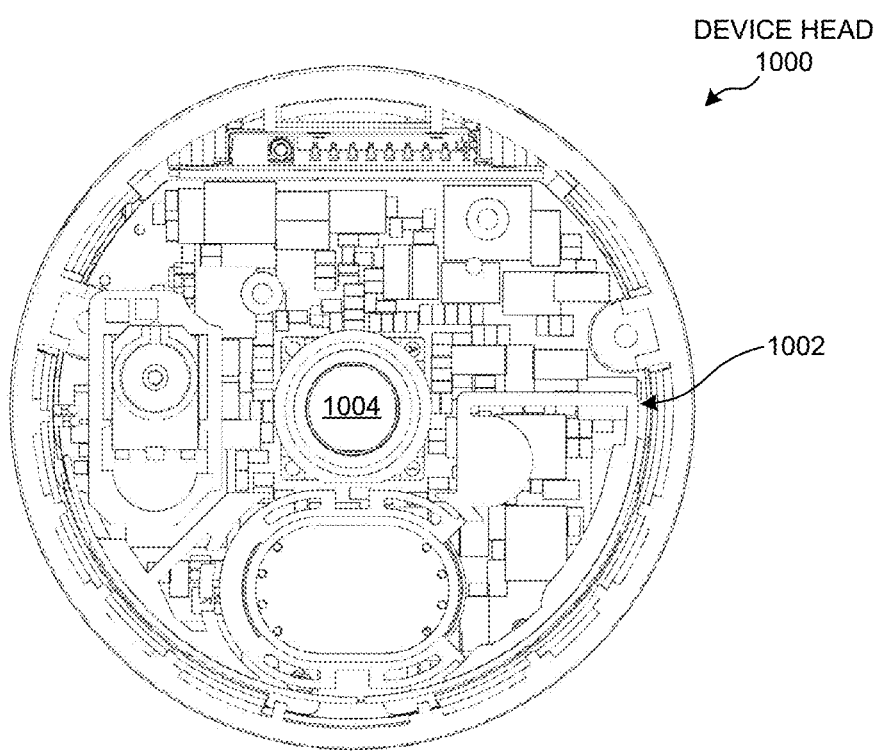
FIG. 10 illustrates a front view of electronic components of a device head in accordance with an embodiment.

FIG. 10 illustrates a front view of electronic components 1002 of a device head 1000 in accordance with an embodiment. In some embodiments, electronic components 1002 can include at least an image sensor 1004 for a camera head component.

Figure 11A:
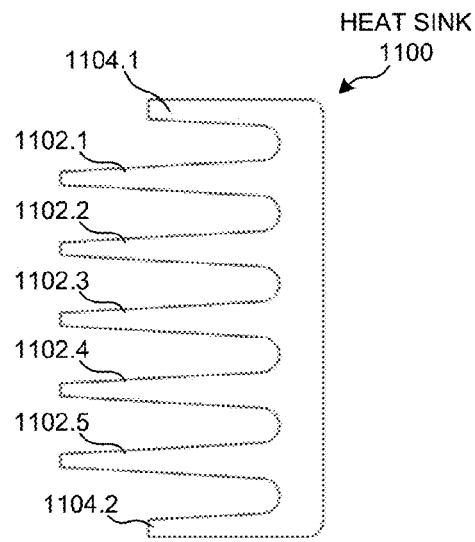
FIG. 11A illustrates a heat sink for a device head in accordance with an embodiment.

FIG. 11A illustrates a heat sink 1100 for a device head in accordance with an embodiment. Heat sink 1100 can include a set of large fins 1102 in between a pair of short fins 1104. Moreover, heat sink 1100 can include a flat rear surface, which facilitates coupling heat sink 1100 to a flat surface of a circuit board or microchip. In some embodiments, fins 1102 can have a length approximately half the width for heat sink 1100. In some embodiments, fins 1102 have a thickness thicker than fins 1104.

Figure 11B:
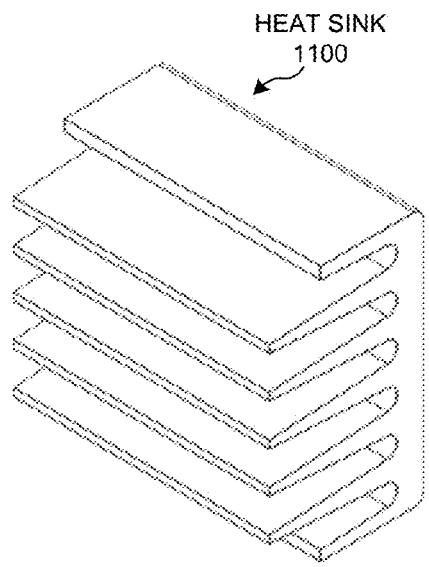
FIG. 11B illustrates an angled view of heat sink in accordance with an embodiment.

FIG. 11B illustrates an angled view of heat sink 1100 in accordance with an embodiment.

Figure 12A:
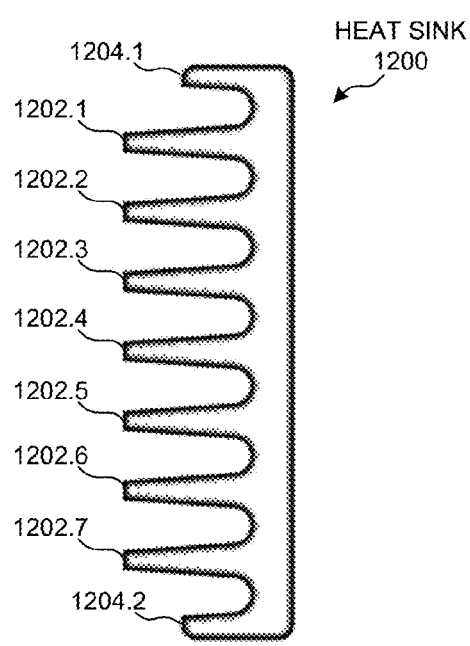
FIG. 12A illustrates an alternative implementation of a heat sink in accordance with an embodiment.

FIG. 12A illustrates an alternative implementation of a heat sink 1200 in accordance with an embodiment. Heat sink 1200 can include a set of large fins 1202 in between a pair of short fins 1204. In some embodiments, fins 1202 can have a length substantially smaller than a width for heat sink 1200.

Figure 12B:
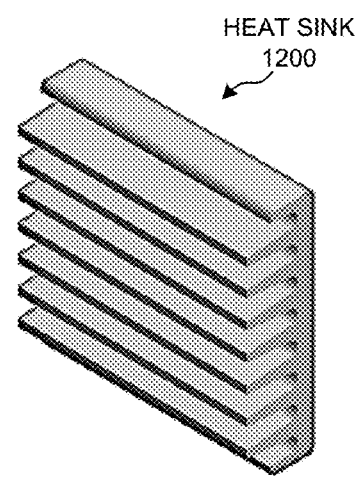
FIG. 12B illustrates an angled view of heat sink in accordance with an embodiment.

FIG. 12B illustrates an angled view of heat sink 1200 in accordance with an embodiment.

Figure 13A:
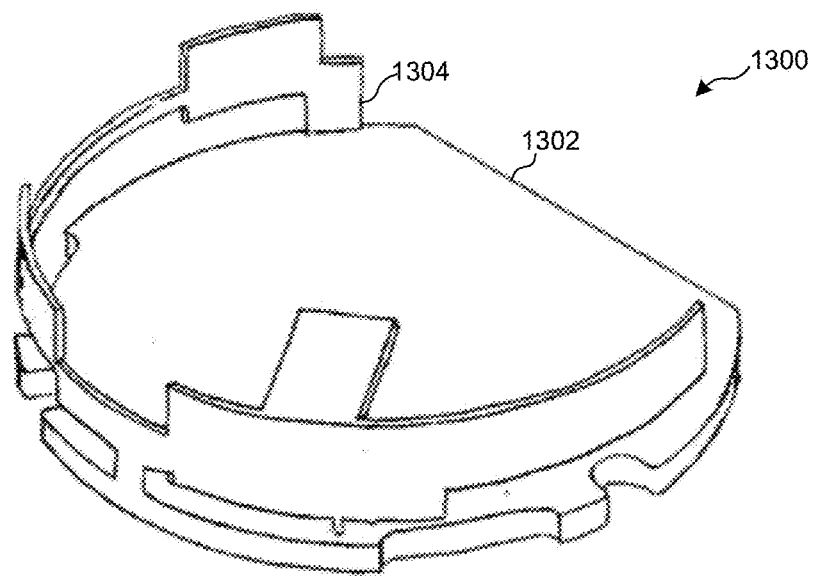
FIG. 13A illustrates an antenna for a device head's wireless radio in accordance with an embodiment.

FIG. 13A illustrates an antenna 1300 for a device head's wireless radio in accordance with an embodiment. In some embodiments, antenna 1300 is curved to match the perimeter of the device head. For example, antenna 1300 can include a flat base 1302 and a curved surface 1304.

Figure 13B:
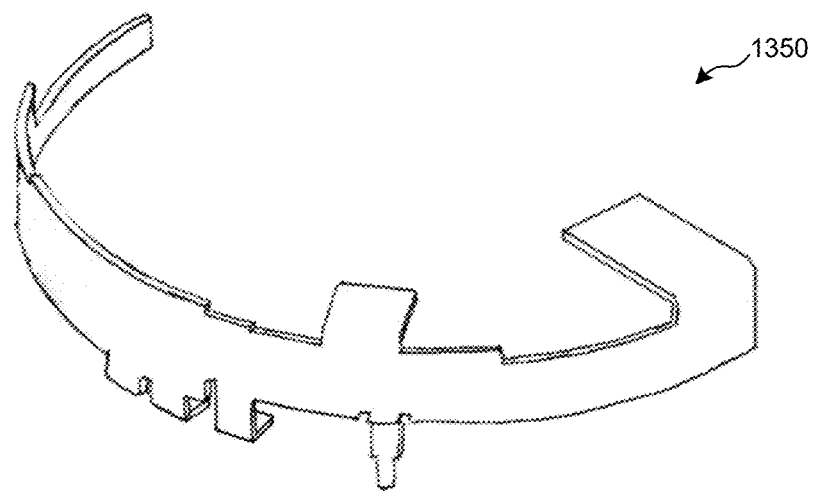
FIG. 13B illustrates an alternative implementation of an antenna in accordance with an embodiment.

FIG. 13B illustrates an alternative implementation of an antenna 1350 in accordance with an embodiment. Specifically, antenna 1350 includes a curved surface that fits in a device head. In some embodiments, antenna 1350 does not include a flat base.

Alternative Connector Base Designs

Figure 14:
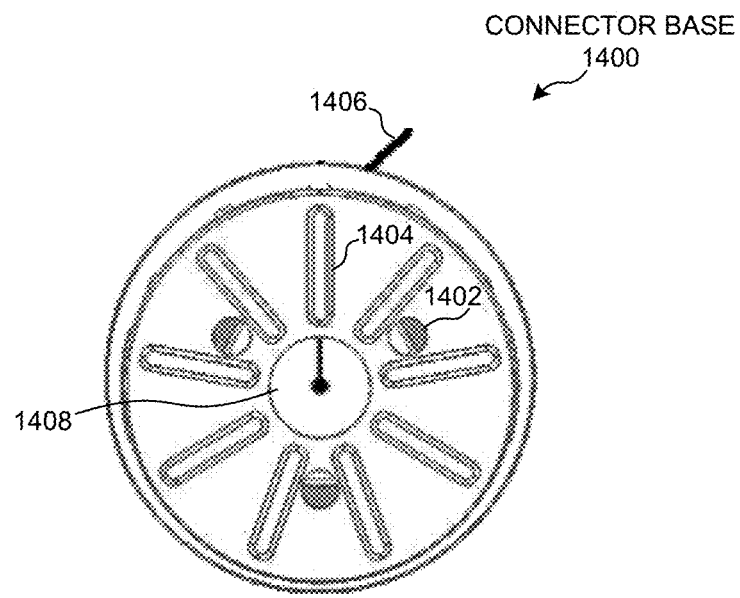
FIG. 14 illustrates a rear view of an alternative implementation of a connector base in accordance with an embodiment.

FIG. 14 illustrates a rear view of an alternative implementation of a connector base 1400 in accordance with an embodiment. Specifically, connector base 1400 can include a set of screw holes 1402 for screwing connector base 1400 onto a flat mounting surface, such as a wall. Connector base 1400 can also include a set of surface pads 1404, which ensure a separation between connector base 1400 and the flat mounting surface. Connector base 1400 can include a power cable 1406 which can be accessed from a side surface of connector base 1400, for receiving at least a power signal from an external power source. In some embodiments, connector base 1400 can include a cable hole 1408 for passing power cable 1406 into the mounting surface without revealing power cable 1406.

Figure 15:
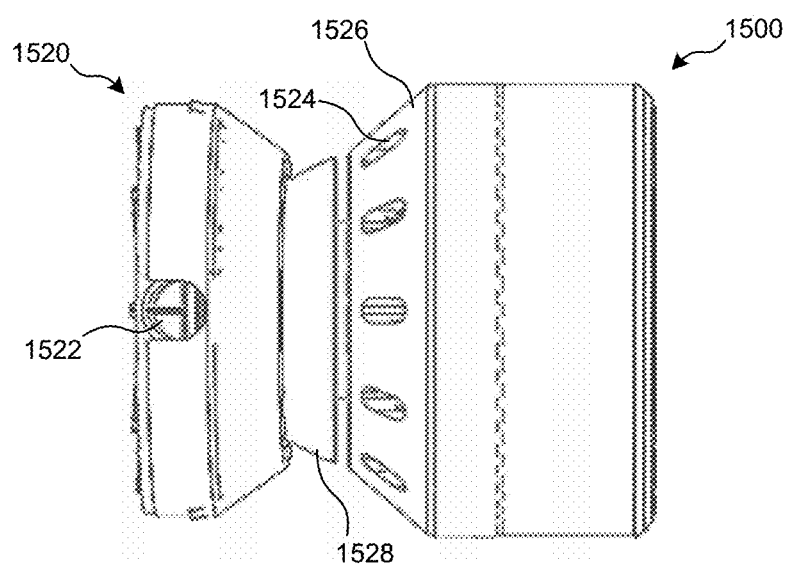
FIG. 15 illustrates a side view of a camera head and connector base in accordance with an embodiment.

FIG. 15 illustrates a side view of a camera head 1500 and connector base 1520 in accordance with an embodiment. Connector base 1500 can include a side hole 1522 for passing a power cable to an external environment for easy access. For example, a user can pass the power cable via side hole 1522 to install connector base 1500 on a wall without having to install the power cable inside the wall. Camera head 1500 can also include a set of low-profile air vents 1524 on an angled surface 1526 that surrounds a contact surface 1528.

Figure 16A:
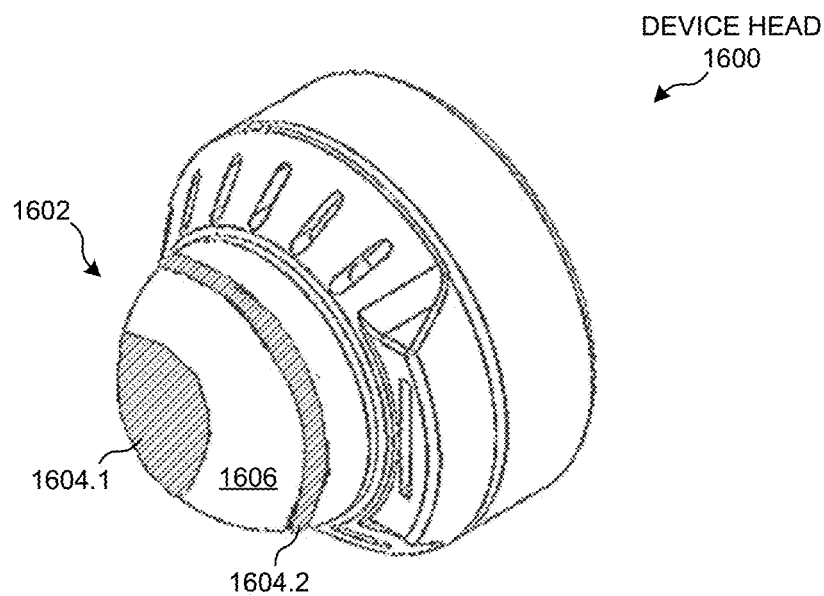
FIG. 16A illustrates an exemplary contact surface for a connector head in accordance with an embodiment.

FIG. 16A illustrates an exemplary contact surface 1602 for a connector head 1600 in accordance with an embodiment. Contact surface 1602 can include multiple conduction surfaces 1604 that are isolated from each other by a non-conductive region 1606. Contact surface 1602 can include a conduction surface 1604.1 along the center of contact surface 1602, and includes another conduction surface 1604.2 along a perimeter of contact surface 1602 that surrounds conduction surface 1604.1 and non-conductive region 1606. A corresponding connector base has a set of connector pins, oriented along sections of the connector base that match the conduction surfaces 1604.1 and 1604.2.

Figure 16B:
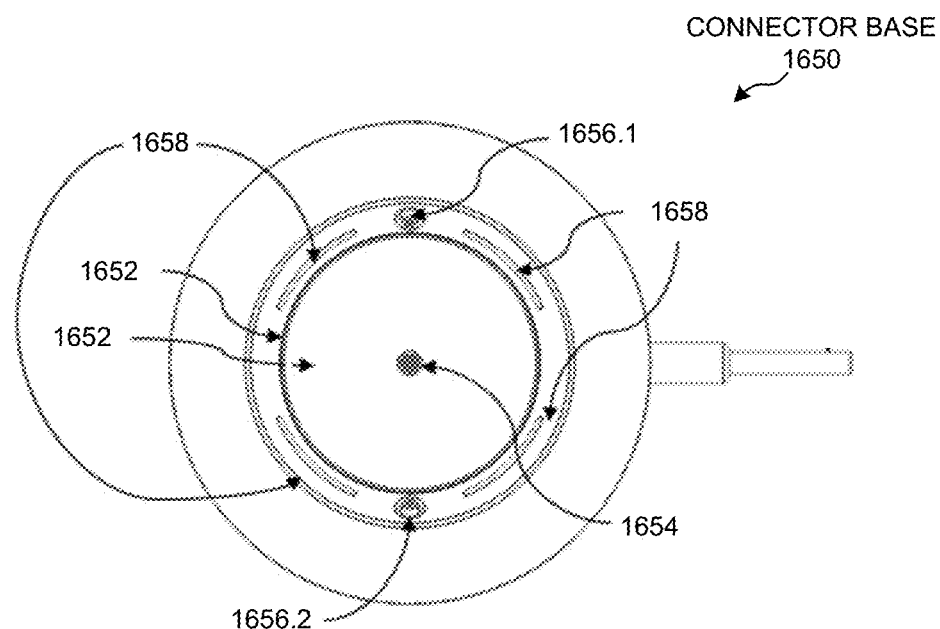
FIG. 16B illustrates an exemplary connector base comprising contact pins for a connector head.

FIG. 16B illustrates an exemplary connector base 1650 comprising contact pins for a connector head. Connector base 1650 can comprise a receptacle surface 1652 comprising a center contact pin 1654, and at least one side pin 1656. Connector base 1650 can also include a set of surface pads 1658, which provide a separation between receptacle surface 1652 and a contact surface of a device head.

Figure 17:
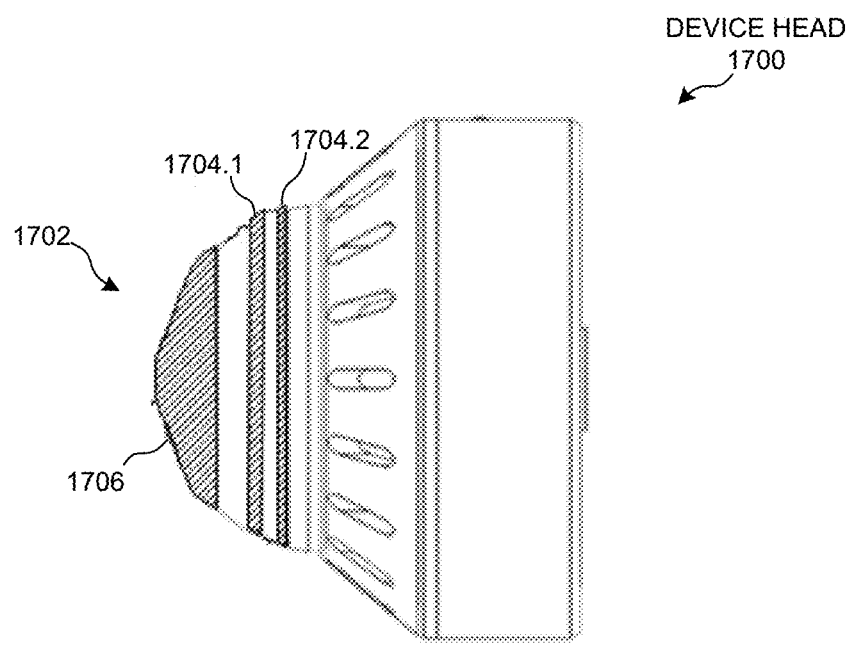
FIG. 17 illustrates an exemplary contact surface for a device head.

FIG. 17 illustrates an exemplary contact surface for a device head 1700. Specifically, device head 1700 can include a contact surface 1702 comprising multiple conduction ring surfaces 1704 (annular contacts), which surround an inner contact surface 1706 at the center of the contact surface 1702.

In some embodiments, a matching connector base (not shown) includes a set of connector pins along its curved surface, such that the placement of the connector pins correspond to the conduction ring surfaces 1704 and inner contact surface 1706. A user may rotate device head 1700 while device head 1700 is mounted on the connector base, without causing conduction ring surfaces 1704 and inner contact surface 1706 from losing a connection to the contact pins on the connector base.

Figure 18A:
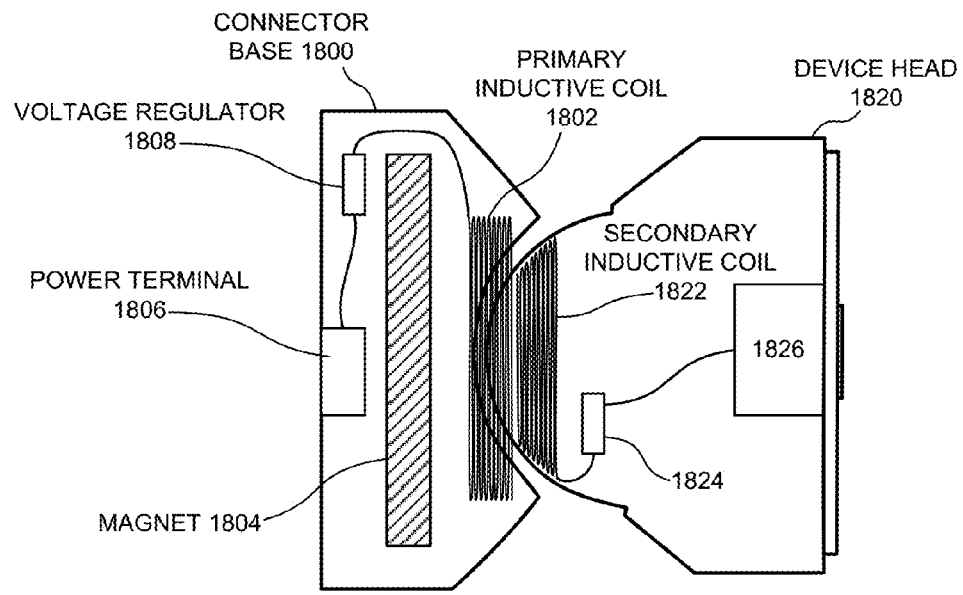
FIG. 18A illustrates an exemplary connector base that provides power to a device head via a wireless power signal in accordance with an embodiment.

FIG. 18A illustrates an exemplary connector base 1800 that provides power to a device head 1820 via a wireless power signal in accordance with an embodiment. Specifically, connector base 1800 can transmit a wireless power signal to device head 1820 via inductive coupling. Connector base 1800 can include a primary inductive coil 1802, which may receive power from a power terminal 1806, and may generate the wireless (e.g., inductive) electrical power signal. Device head 1820 can include a secondary inductive coil 1822, which can react to the inductive power signal to induce an electrical current for device head 1820.

Connector base 1800 may include a voltage regulator 1808 that may regulate the voltage from power terminal 1806 to produce a near-constant output voltage. Primary inductive coil 1802 can use the output voltage of voltage regulator 1808 to produce a near-constant wireless electrical power signal. Device head 1820 may also include a voltage regulator 1824 that takes an electrical power signal produced by secondary inductive coil 1822, and can produce another power signal that may include a near-constant voltage. Device head 1820 can include electronic circuits 1826 (e.g., an image sensor, a microprocessor, a wireless radio, etc.) that take the output power signal from voltage regulator 1824 as a power source.

In some embodiments, the amount of electrical current induced on secondary inductive coil 1822 may change when a user adjusts the orientation of device head 1820 with respect to connector base 1800. For example, primary inductive coil 1082 may induce a maximum amount of current on secondary inductive coil 1822 when secondary inductive coil 1822 is substantially parallel to primary inductive coil 1802. However, if a user adjusts the position of device head 1820 relative to connector base 1800, the angle between secondary inductive coil 1822 and primary inductive coil 1802 may increase, which in turn decreases the current induced on secondary inductive coil 1822. To account for the varying current induced on secondary inductive coil 1822, device head 1820 may include a voltage regulator 1824 that may take an electrical power signal produced by secondary inductive coil 1822, and can produce an output power signal that may include a near-constant voltage. Device head 1820 can include electronic circuits 1826 (e.g., an image sensor, a microprocessor, a wireless radio, etc.) that take the output power signal from voltage regulator 1824 as a power source.

Connector base 1800 can include a magnet 1804 behind inductive coil 1802. Magnet 1804 may generate a minimum magnetic field necessary to attract the ferromagnetic (e.g., metal) material of device head 1820, which may keep device head 1820 mounted against connector base 1800. Moreover, primary inductive coil 1802 may itself add to the magnetic field emitted by magnet 1804 when a current flows through primary inductive coil 1802, and may provide further stability of device head 1820.

In some embodiments, the additional magnetic force emitted by primary inductive coil 1802 may be sufficiently strong to prevent device head 1820 from being removed from connector base 1800. This additional magnetic force can provide a theft-deterrent solution that may prevent a malicious person from removing device head 1820 from connector base 1800, for example, to disable device head 1820 (e.g., to disable a security camera or microphone), or to steal device head 1820. An authorized operator may remove device head 1820 from connector base 1800 by turning off power to connector base 1800, or by configuring connector base 1800 to decrease or cut off power to primary inductive coil 1802. For example, connector base 1800 may include a key lock that, when disabled, can decrease and cut off power to primary inductive coil 1802. Alternatively, a system administrator can configure device head 1820 to become "unlocked" from connector base 1800 over a computer network (e.g., a wireless network). Device head 1820 may then send a short-distance wireless signal that may configure connector base 1800 to decrease or cut off power to primary inductive coil 1802.

In some embodiments, connector base 1800 can include a concave receptacle surface, and primary inductive coil 1802 may be at least partially surrounding the concave receptacle surface of connector base 1800. Moreover, device head 1820 can include a convex contact surface, and secondary inductive coil 1822 may be at least partially surrounded by the convex contact surface of device head 1820. When the convex contact surface of device head 1820 is mounted in the concave receptacle surface of connector base 1800, primary inductive coil 1802 induces a current on secondary inductive coil 1822 of device head 1820 to provide power to device head 1820.

Figure 18B:
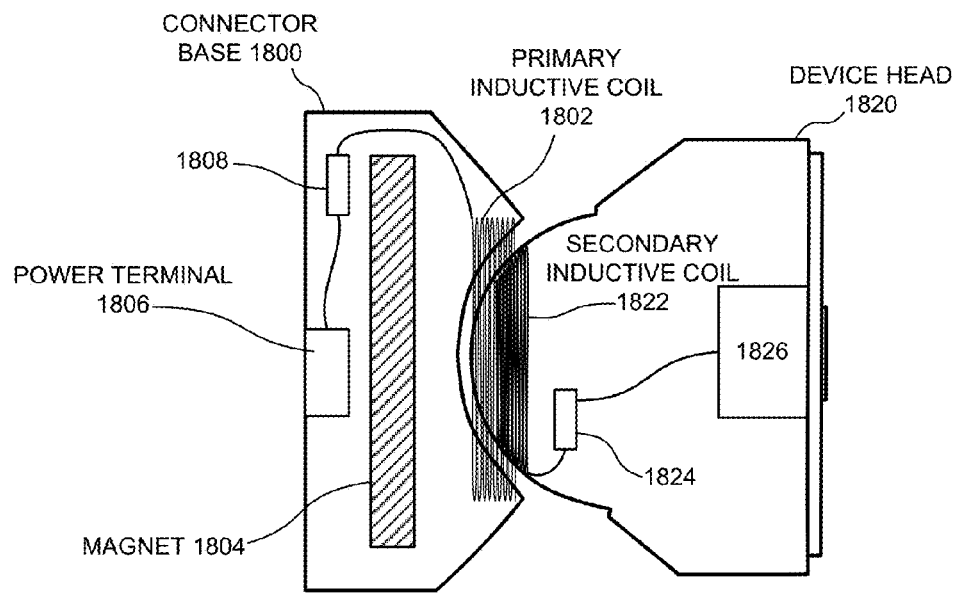
FIG. 18B illustrates an exemplary configuration of the connector base in accordance with an embodiment.

In some embodiments, primary inductive coil 1802 may at least partially overlap secondary inductive coil 1822 when device head 1820 is mounted on connector base 1800. FIG. 18B illustrates an exemplary configuration of connector base 1800 in accordance with an embodiment. In this exemplary configuration, primary inductive coil 1802 may substantially surround the concave receptacle surface of connector base 1800, which in turn may increase an overlapping surface between primary inductive coil 1802 and secondary inductive coil 1822. Hence, configuring primary inductive coil 1802 to increase the amount of the concave receptacle surface that it surrounds may in turn increase an amount of current that primary inductive coil 1802 may induce upon secondary inductive coil 1822.

Figure 18C:
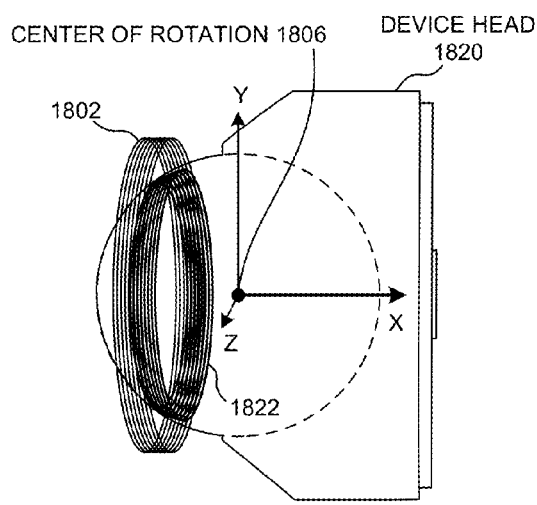
FIG. 18C illustrates an exemplary configuration of a secondary inductive coil relative to a primary inductive coil in accordance with an embodiment.

FIG. 18C illustrates an exemplary configuration of secondary inductive coil 1822 relative to primary inductive coil 1802 in accordance with an embodiment. Specifically, secondary inductive coil 1822 may form a ring on a plane that is substantially parallel to a front face of device head 1820, primary inductive coil 1802 may form a ring on a plane that is substantially parallel to a rear face of connector base 1800. Hence, when device head 1820 is configured in a front-facing orientation relative to connector base 1800, the planes corresponding to primary inductive coil 1802 and secondary inductive coil 1822 may be substantially parallel to each other.

In some embodiments, the convex contact surface of device head 1820 may form a semi-sphere with a center of rotation 1806. If a user were to adjust the orientation of device head 1820 relative to connector base 1800, device head 1820 and 1820 and secondary inductive coil 1822 may rotate along center of rotation 1806. Secondary inductive coil 1822 may be centered along an X-axis of center of rotation 1806, and the plane corresponding to secondary inductive coil 1822 may be parallel to a plane formed by a Y-axis and a Z-axis of center of rotation 1806.

Figure 18D:
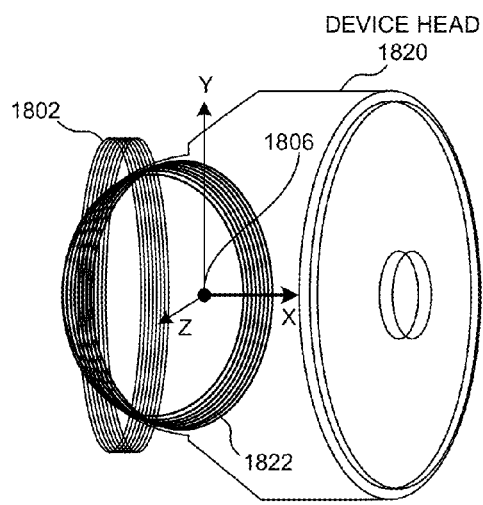
FIG. 18D illustrates the device head rotated along a Y-axis in accordance with an embodiment.

FIG. 18D illustrates device head 1820 rotated along the Y-axis in accordance with an embodiment. For example, the user may pan device head 1820 to the right, which in turn rotates secondary inductive coil 1822 and the front face of device head 1820 along the Y-axis. In this orientation, the plane formed by secondary inductive coil 1822 to no longer be parallel to a plane formed by primary inductive coil 1802. One side of secondary inductive coil 1822 may enter deeper into secondary inductive coil 1802, while an opposing side of secondary inductive coil 1822 may move away from primary inductive coil 1802.

As was described earlier, configuring secondary inductive coil 1822 to no longer be parallel to primary inductive coil may decrease an amount of current that primary inductive coil 1822 may induce upon secondary inductive coil. In some embodiments, the current induced upon secondary inductive coil 1822 in any orientation of device head 1820 may be within a tolerance associated with device head 1820. Moreover, voltage regulator 1824 of device head 1820 may convert the electrical power signal produced by secondary inductive coil 1822 into an output power signal that satisfies the power requirements of device head 1820.

Figure 18E:
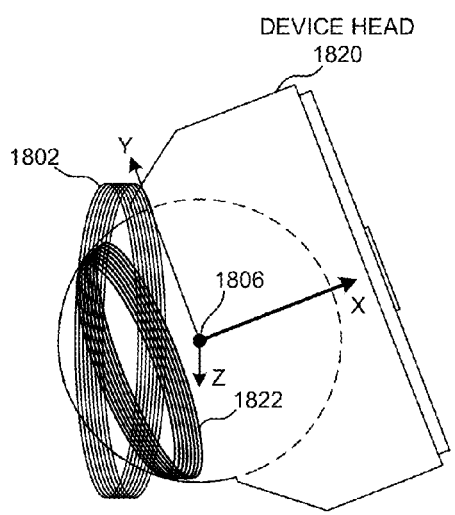
FIG. 18E illustrates the device head rotated counter-clockwise along a Z axis in accordance with an embodiment.

FIG. 18E illustrates device head 1820 rotated counter-clockwise along the Z axis in accordance with an embodiment. For example, the user may pan device head 1820 upward, which in turn may rotate secondary inductive coil 1822 and the front face of device head 1820 counter-clockwise along the Z-axis.

Figure 18F:
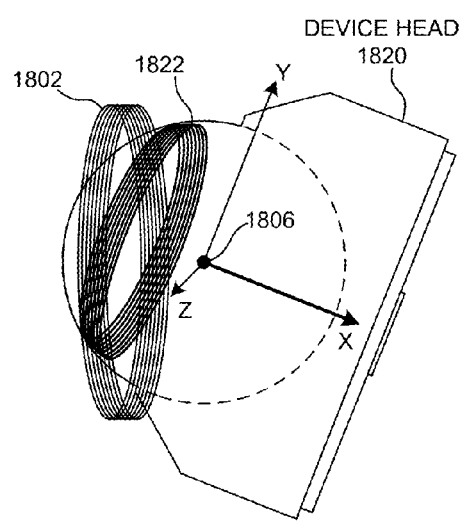
FIG. 18F illustrates the device head rotated clockwise along a Z axis in accordance with an embodiment.

FIG. 18F illustrates device head 1820 rotated clockwise along the Z axis in accordance with an embodiment. The user may pan device head 1820 downward, which in turn may rotate secondary inductive coil 1822 and the front face of device head 1820 clockwise along the Z-axis.

In some embodiments, the user may also rotate device head 1820 along the X-axis of center of rotation 1806. For example, if device head 1820 includes an image sensor for capturing pictures or video in a wide-screen format (e.g., with a larger image width than height), the user can rotate device head 1820 around the X-axis by 90 degrees to capture images or video in portrait mode (e.g., with a larger image height than width). Rotating device head 1820 along the X-axis may not affect the amount of current that primary inductive coil 1802 induces upon secondary inductive coil 1822.

Figure 18G:
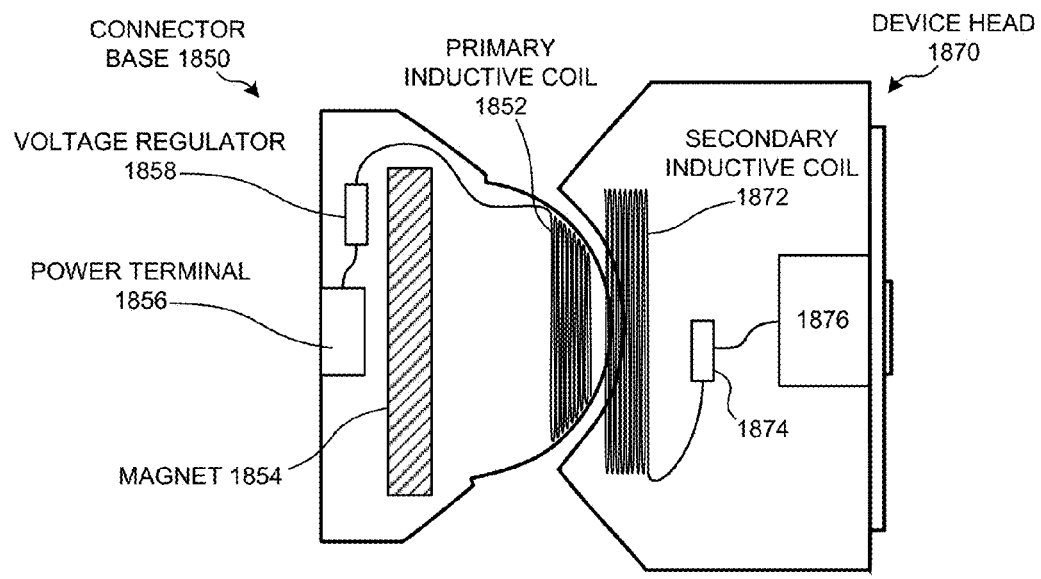
FIG. 18G illustrates an exemplary connector base with a convex receptacle surface and a device head with a concave contact surface in accordance with an embodiment.

FIG. 18G illustrates an exemplary connector base 1850 with a convex receptacle surface and a device head 1870 with a concave contact surface in accordance with an embodiment. Connector base 1850 can include a primary inductive coil 1852 inside the concave receptacle surface, and device head 1870 can include a secondary inductive coil 1872 near the concave contact surface. In some embodiments, secondary inductive coil 1872 may at least partially surround a portion of the concave receptacle surface. When the concave contact surface of device head 1870 is mounted on the concave receptacle surface of connector base 1850, primary inductive coil 1852 may induce a current on secondary inductive coil 1872 of device head 1870.

In some embodiments, connector base 1850 may include a magnet 1854 behind the convex receptacle surface of connector base 1850. Connector base 1850 may also include a power terminal 1856 for coupling a power cable to connector base 1850, and may include a voltage regulator 1858 which may regulate the voltage from power terminal 1856 to produce a near-constant output voltage.

Device head 1870 can also include a voltage regulator 1874, which can generate an output power signal with a near constant voltage from the electric current produced by secondary inductive coil 1872. The output power signal can power an electronic circuit 1876 of device head 1870.

Figure 18H:
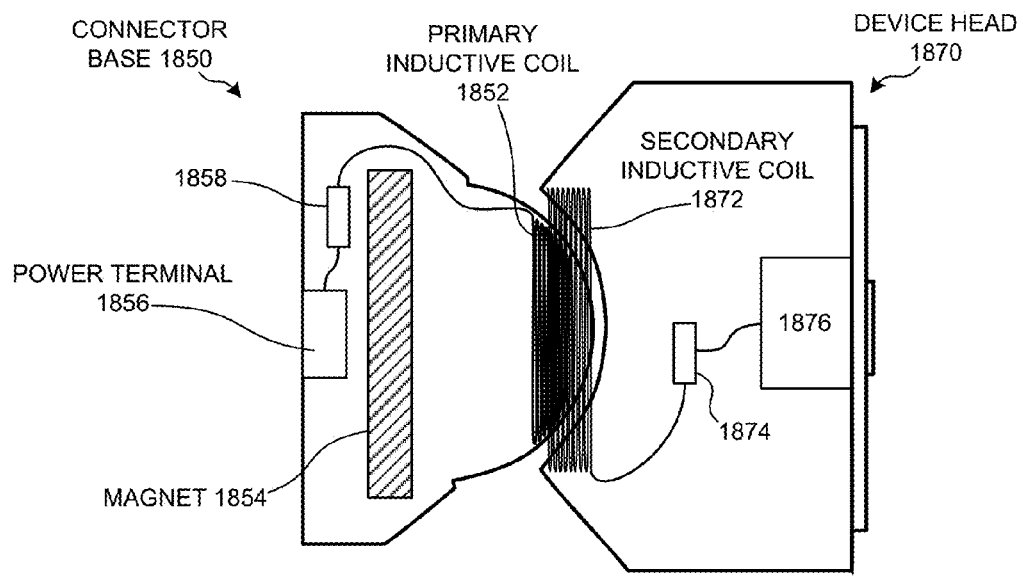
FIG. 18H illustrates an exemplary connector base with a primary inductive coil that may at least partially overlap a secondary inductive coil of the device head in accordance with an embodiment.

FIG. 18H illustrates an exemplary connector base 1850 with a primary inductive coil 1852 that may at least partially overlap secondary inductive coil 1872 of a device head 1870 in accordance with an embodiment. For example, primary inductive coil 1852 may substantially surround the concave receptacle surface of connector base 1850. When device head 1870 is mounted on connector base 1850, this configuration may increase an overlap amount between primary inductive coil 1852 and secondary inductive coil 1872, which in turn may increase an amount of current that primary inductive coil 1872 may induce upon secondary inductive coil 1872.

In some embodiments, the device head can include a permanent magnet that can be mounted in a fixed position in the device head, or can be mounted on an actuator that moves the permanent magnet within the device head. The permanent magnet can cause the device head to be mounted on a connector base by emitting a magnetic field that attracts the permanent magnet to a magnetically sensitive material on the connector base, such as a metal plate or permanent magnet coupled to or inside the connector base.

Figure 19:
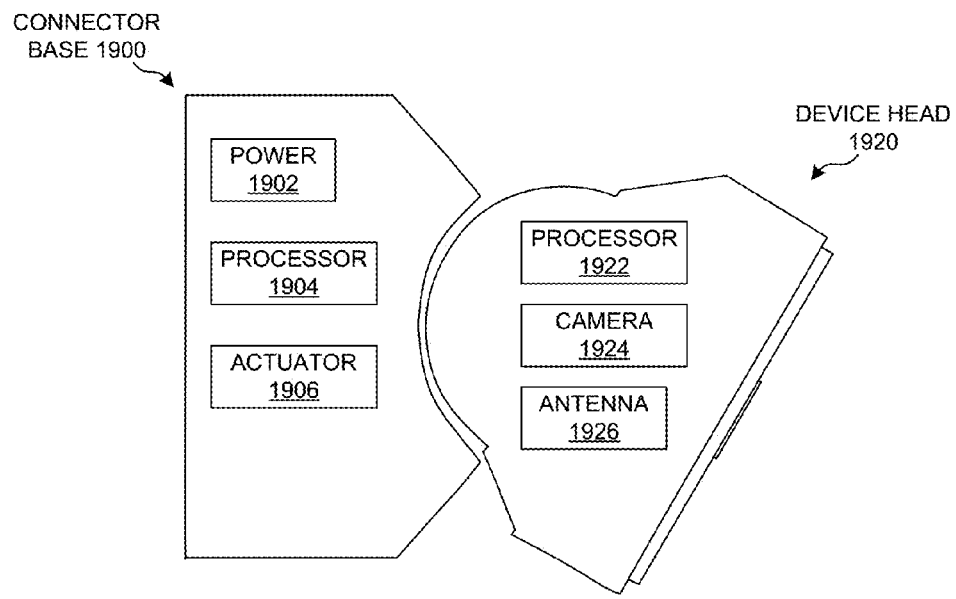
FIG. 19 illustrates an exemplary connector base comprising an actuator for adjusting an orientation of a device head in accordance with an embodiment.

FIG. 19 illustrates an exemplary connector base 1900 comprising an actuator 1906 for adjusting an orientation of a device head 1920 in accordance with an embodiment. Connector base can include a processing unit 1904 which receives power from a power source 1902, and supplies power to actuator 1906 that adjusts an orientation of device head 1920 while the camera head is mounted on the connector base. For example, actuator 1906 can adjust a position of a permanent magnet in connector base 1900, which attracts a permanent magnet in device head 1920 toward a surface portion of the receptacle surface of connector base 1900. As another example, actuator 1906 can move one or more wheels of connector base that are in contact with a contact surface of device head 1920. Actuator 1906 can rotate the wheels to cause device head 1920 to pan, tilt, or rotate.

In some embodiments, processing unit 1904 can receive instructions from a remote computer over a network interface, or from device head 1920. This allows a user or a remote computer to remotely adjust the direction and/or rotation angle of device head 1920.

Figure 20:
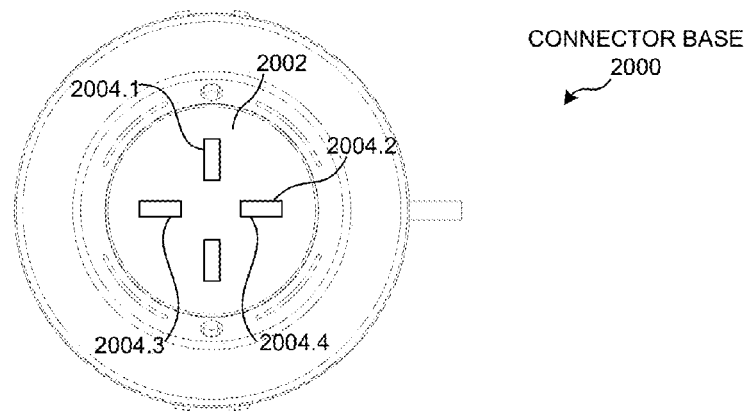
FIG. 20 illustrates a front view of a connector base comprising multiple wheels for adjusting a device head's orientation in accordance with an embodiment.

FIG. 20 illustrates a front view of a connector base 2000 comprising multiple wheels 2004 for adjusting a device head's orientation in accordance with an embodiment. When the device head is mounted on connector base 2000, the magnetic field emitted by connector base 2000 attracts a metal or magnetic material of the device head (e.g., the curved section of the device head) toward receptacle surface 2002. This same magnetic field presses the curved section of the device head against wheels 2004 that are rotated by the actuator of connector base 2000, which help wheels 2004 to grip against the curved portion of the device head while rotating to adjust the direction or tilt of the device head.

Figure 21:
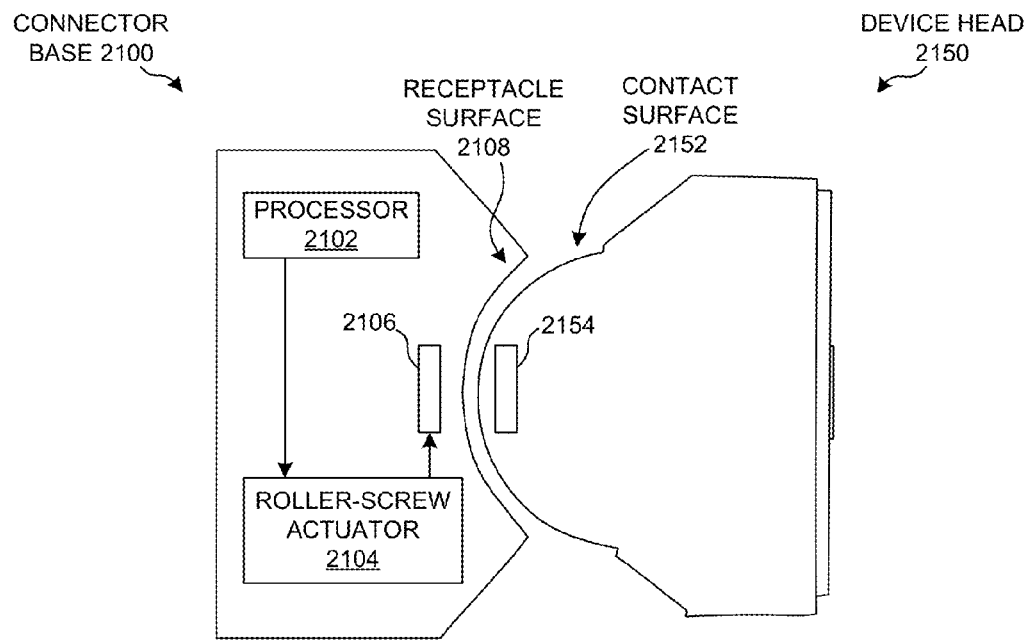
FIG. 21 illustrates an exemplary connector base comprising a roller-screw actuator for adjusting a position of a permanent magnet in accordance with an embodiment.

FIG. 21 illustrates an exemplary connector base 2100 comprising a roller-screw actuator 2104 for adjusting a position of a permanent magnet 2106 in accordance with an embodiment. Roller-screw actuator 2104 converts a rotational motion to a linear motion that slides magnet 2106 along a rear section of receptacle surface 2018.

Device head 2150 can also include a magnet 2154 coupled to or near a contact surface 2152 of device head 2150, which can be used to adjust the direction of device head 2150 via a magnetic field. The magnetic field emitted by magnet 2106 of connector base 2100 attracts magnet 2154 of device head 2150 when device head 2150 is within a threshold distance of connector base 2100.

Figure 22:
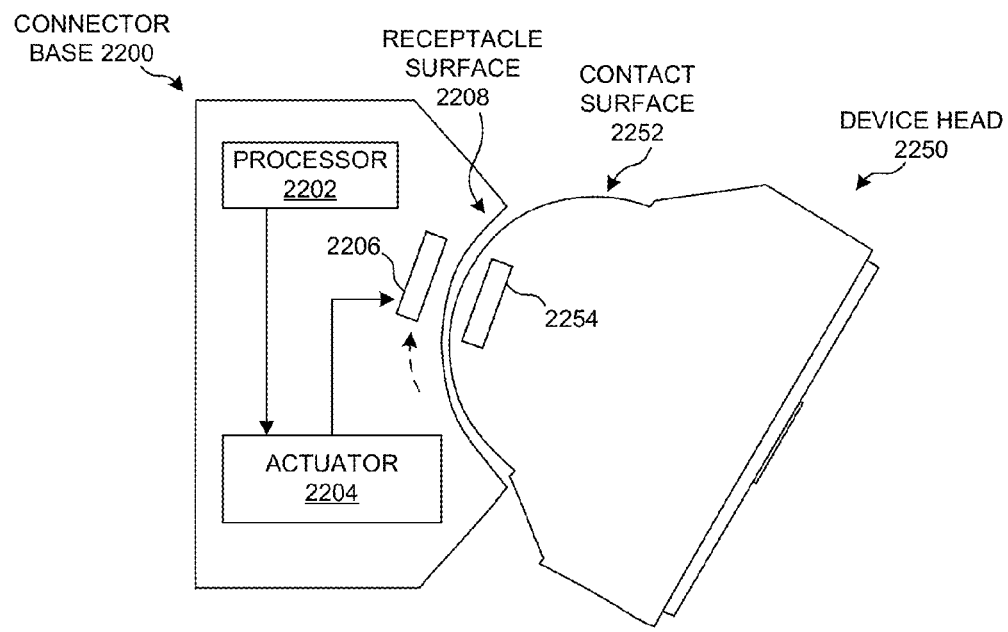
FIG. 22 illustrates an exemplary connector base comprising an actuator with two degrees of movement for adjusting a magnet's position in accordance with an embodiment.

FIG. 22 illustrates an exemplary connector base 2200 comprising an actuator 2204 with two degrees of movement for adjusting a magnet's position in accordance with an embodiment. Connector base 2200 can include a magnet 2206 that serves the purpose of attracting a device head 2250 to the connector base (e.g., to keep device head 2250 mounted on connector base 2200), and can also serve the purpose of adjusting the direction of the device head 2250 while device head 2250 is mounted on connector base 2200. Actuator 2204 moves magnet 2206 along two axis of an inner receptacle surface 1108 of connector base 2200, which alters the direction of device head 2250 by attracting a magnet 2254 inside or attached to device head 2250.

In some other embodiments, a device head can include a magnet attached to an actuator, which can move the placement of the device head's magnet to adjust the orientation of the device head.

Figure 23:
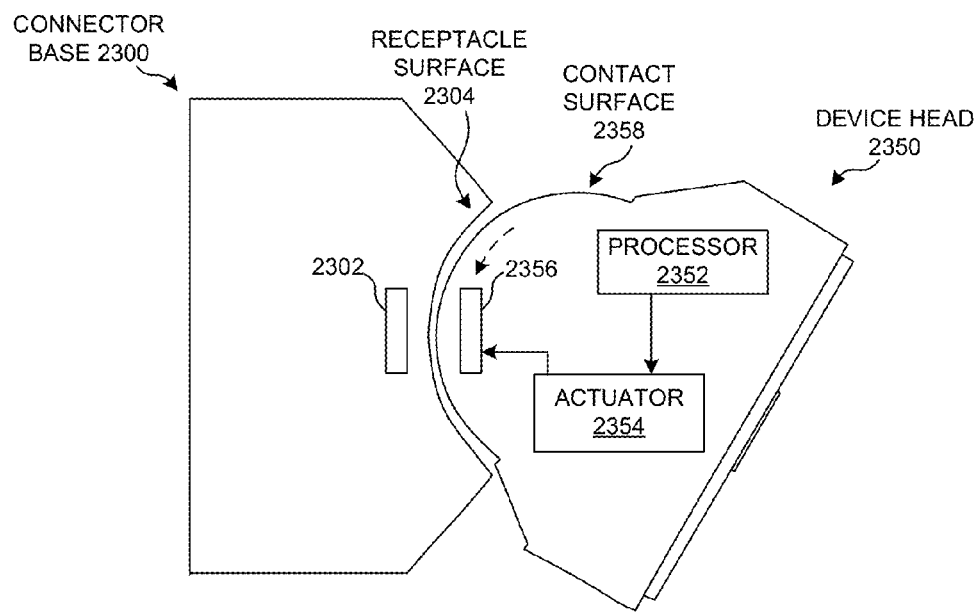
FIG. 23 illustrates an exemplary device head comprising an adjustable magnet for adjusting an orientation of device head while mounted on a connector base in accordance with an embodiment.

FIG. 23 illustrates an exemplary device head 2350 comprising an adjustable magnet 2356 for adjusting an orientation of device head 2350 while mounted on a connector base 2300 in accordance with an embodiment.

Specifically, device head 2350 can include an actuator 2354 that adjusts the position of magnet 2356. A processing unit 2352 inside device head 2350 can receive commands from a remote computer that instructs device head 2350 to adjust its direction. Processing unit 2352 then executes these commands by activating actuator 2354 to adjust the position of magnet 2356 along one or two axes. Magnet 2356 inside device head 2350 will remain relatively fixed with respect to the magnet inside connector base 2300. However, because the position of magnet 2356 inside device head 2350 moves relative to the chassis of device head 2350, the motion of magnet 2356 inside device head 2350 causes a direction of device head 2350 to change relative to connector base 2300. This configuration minimizes the features and cost of connector base 2300, whose core purpose is to mount device head 2350 via its fixed magnet, and to provide power to the device head 2350.

Figure 24A:
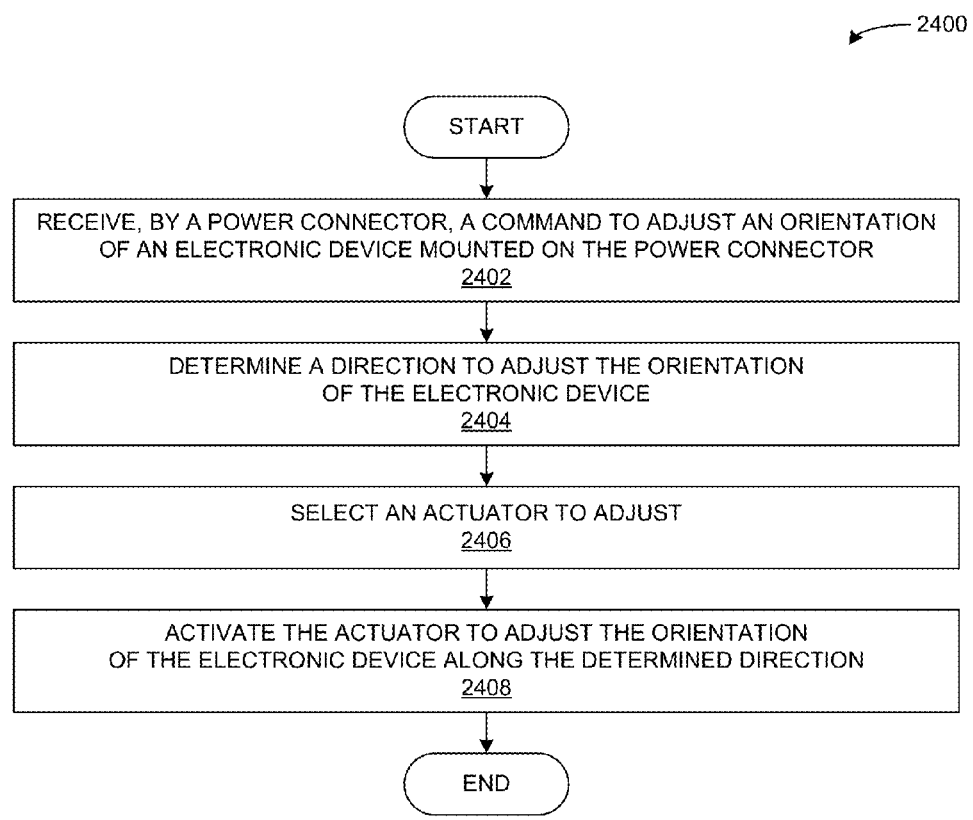
FIG. 24A presents a flow chart illustrating a method for a power connector to adjust an orientation of a mounted electronic device in accordance with an embodiment.

FIG. 24A presents a flow chart illustrating a method for a power connector to adjust an orientation of a mounted electronic device in accordance with an embodiment. The power connector can have an electronic device mounted on the receptacle surface of the power connector. During operation, the power connector can receive a command to adjust an orientation of the electronic device (operation 2402). In some embodiments, the power connector can include a network connection (e.g., via an Ethernet network interface), and receives the command from a remote computer via the network connection. In some other embodiments, the power connector includes a peer-to-peer communication interface with the electronic device, and receives the command from the electronic device.

The power connector analyzes the command to determine a direction to adjust the orientation of the electronic device (operation 2404), and selects at least one actuator to activate based on the determined direction (operation 2406). The power connector then activates the selected actuator to adjust the orientation of the electronic device along the determined direction (operation 2408).

In some embodiments, the actuator can include a wheel mounted on the power connector, such that the wheel is in contact with a contact surface of the electronic device. The power connector can activate the actuator to rotate the wheel, which causes the orientation of the electronic device to change along the determined direction.

In one variation, the actuator includes a magnet mounted on the power connector, which emits a magnetic field to attract a device-side on the electronic device toward the magnet on the power connector. When the power connector activates the actuator, the actuator moves the magnet on the power connector along the determined direction to cause the magnetic field to attract the device-side magnet to a new position along the determined direction.

In a further variation, the actuator can be mounted on the electronic device, and the power connector can activate the actuator by sending a signal to the electronic device. The electronic device can respond to the signal by activating the actuator to adjust the orientation of the electronic device along the determined direction.

Figure 24B:
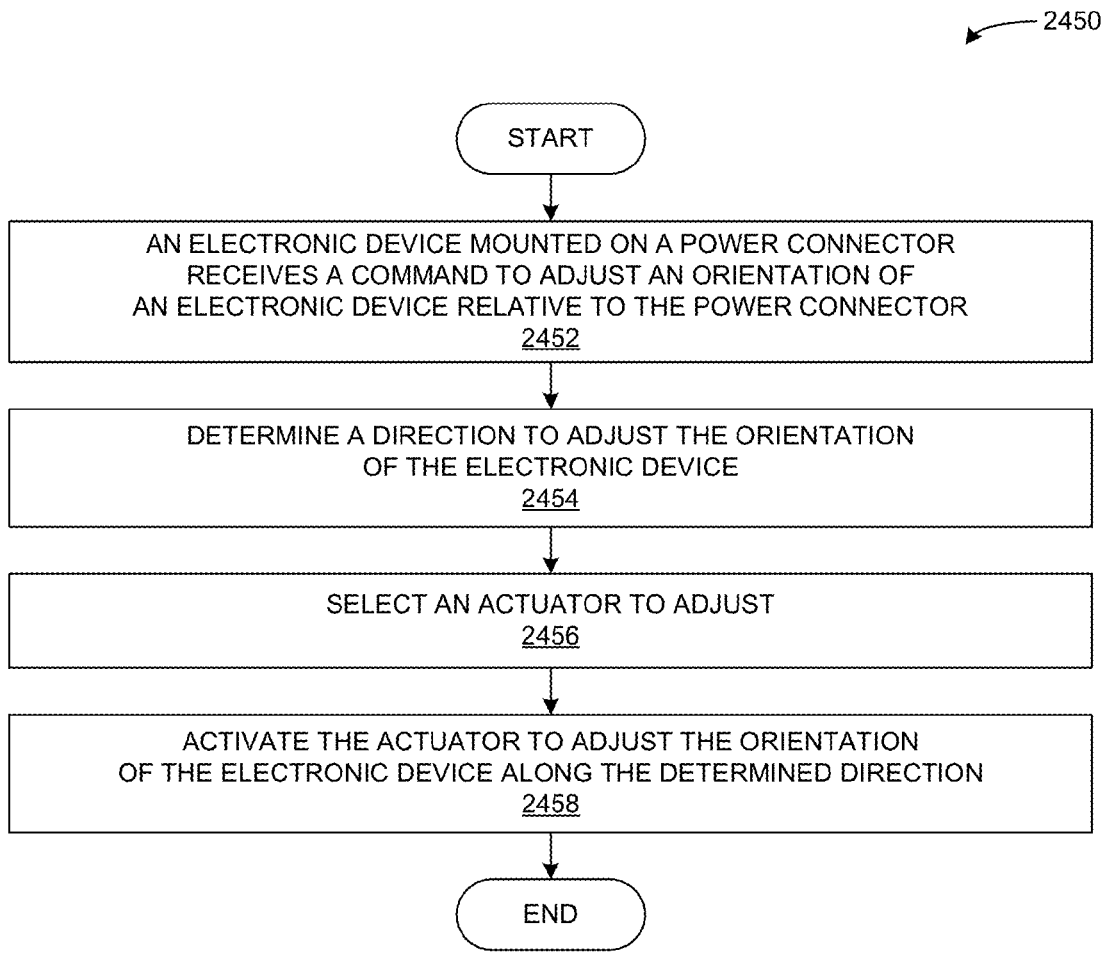
FIG. 24B presents a flow chart illustrating a method for an electronic device to adjust its orientation while mounted on a power connector in accordance with an embodiment.

FIG. 24B presents a flow chart illustrating a method for an electronic device to adjust its orientation while mounted on a power connector in accordance with an embodiment. The electronic device may be mounted on a receptacle surface of a power connector by a magnetic field. During operation, the electronic device can receive a command to adjust an orientation of the electronic device relative to the power connector (operation 2452). In some embodiments, the electronic device can include a network connection, such as a wireless network interface (e.g., Wi-Fi), or a wired network interface via the power connector. The electronic device can receive the command from a remote computer via the network connection. In some other embodiments, the electronic device includes a peer-to-peer communication interface with the power connector, and receives the command from the power connector.

The electronic device analyzes the command to determine a direction to adjust the orientation of the electronic device (operation 2454), and selects at least one actuator to activate based on the determined direction (operation 2456). The electronic device then activates the selected actuator to adjust the orientation of the electronic device along the determined direction (operation 2458).

In some embodiments, the actuator can include a wheel mounted on the electronic device, such that the wheel is in contact with a receptacle surface of the power connector. The electronic device can activate the actuator to rotate the wheel, which causes the orientation of the electronic device to change along the determined direction.

In one variation, the actuator includes a magnet mounted on the electronic device, which emits a magnetic field to attract a receptacle-side on the power connector toward the magnet on the electronic device. When the electronic device activates the actuator, the actuator moves the magnet on the electronic device along the determined direction to cause the electronic device to be repositioned along the determined direction while the magnetic field preserves the device-side magnet's position relative to the receptacle-side magnet.

In a further variation, the actuator can be mounted on the power connector, and the electronic device can activate the actuator by sending a signal to the power connector. The power connector can respond to the signal by activating the actuator to adjust the orientation of the electronic device along the determined direction.

Cable Connector with Rotatable Head

In some embodiments, the device coupled to the connector base is a cable, such as a power cable and/or a data cable of an electronic device (e.g., a handheld digital camera, or a laptop). In some other embodiments, the connector base exists at one end of a cable (e.g., a power cable, a data cable, or a Power-over-Ethernet cable) that can be used to provide power or network connection to an electronic device.

Hence, the adjustable rotational orientation of the connector base allows a user to attach the cable to the connector base (or to an electronic device) in any rotational orientation, thus not requiring the user to first determine how the user needs to rotate the cable prior to coupling the cable to the connector base (or to the electronic device). Moreover, the adjustable rotational orientation of the connector base allows the cable to release tension by rotating along the surface of the connector base, without loosing power or network connection from the connector base.

Also, because the cable remains affixed to the connector base via a magnetic force (and not by a locking mechanism or by a sidewall resistance as is typical of ordinary connectors), the cable can be easily removed by a user by applying a small pulling force on the connector base. The cable can also become unplugged from the electronic device, or the connector base, if a person accidentally yanks on the cable or trips on the cable. This can prevent the electronic device from being yanked from its current position and onto the floor, potentially saving the electronic device from breaking.

Figure 25:
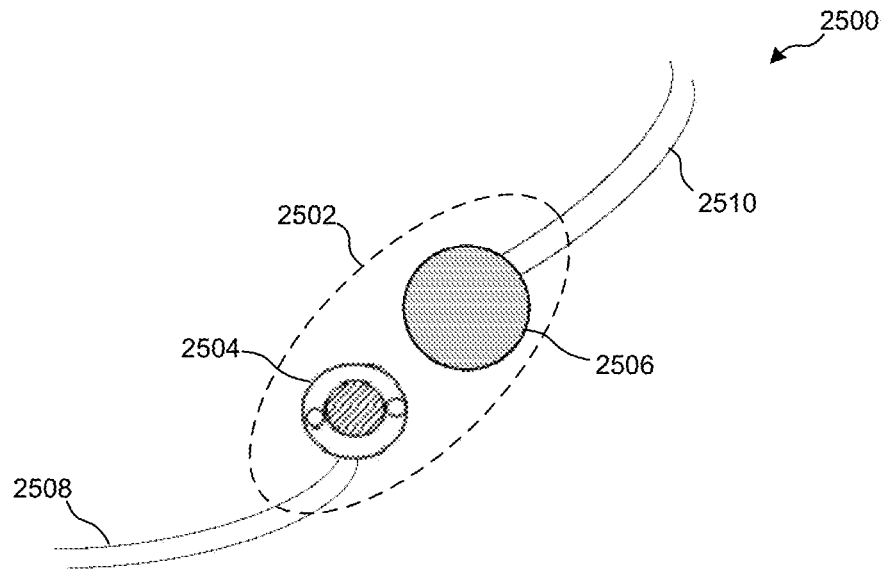
FIG. 25 illustrates an exemplary cable comprising a rotatable connection point in accordance with an embodiment.

FIG. 25 illustrates an exemplary cable 2500 comprising a rotatable connection point 2502 in accordance with an embodiment. Specifically, rotatable connection point 2502 can include a connector base 2504 comprising a receptacle surface, and a connector head 2506 comprising a contact surface.

In some embodiments, connector base 2504 and connector head 2506 can be used to create a power cable (e.g., an extension cable). For example, a first cable section 2508 of cable 2500 can include connector base 2504 at one end, and a second cable section 2510 of cable 2500 can include connector head 2506 at one end. Coupling connector head 2506 to connector base 2504 completes the power cable which transmits a power signal (and/or a data signal) over cable 2500.

Recall that a connector head can rotate within a connector base. Typical power cables and extension cables can accrue torsion when an object at one end of the cable is moved around and rotated. However, cable 2500 that includes connector base 2504 and connector head 2506 can untangle itself, as one section of cable 2500 can rotate freely from the second section of cable 2500 when torsion in the cable exceeds a maximum torsion threshold.

In some embodiments, connector head 2506 can be detached from connector base 2504 by pulling on connector head 2506 with a small force (greater than a minimal detaching force). Hence, cable 2500 comprising connector base 2504 and connection head 2506 is not a tripping hazard, unlike typical power cables. If a person kicks or otherwise walks into cable 2500, the force against cable 2500 is sufficient to cause first cable section 2508 to become detached from second cable section 2510, thus preventing the person from tripping on cable 2500.

Figure 26:
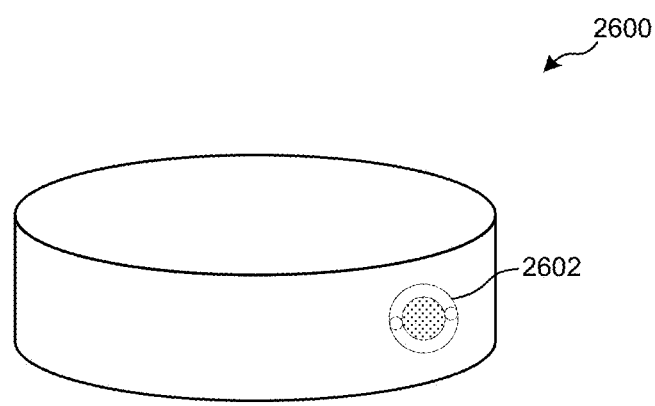
FIG. 26 illustrates an exemplary electronic device comprising a connector base that mates with a connector head of a power cable in accordance with an embodiment.

FIG. 26 illustrates an exemplary electronic device 2600 comprising a connector base 2602 that mates with a connector head of a power cable in accordance with an embodiment. Electronic device 2600 can use connector base 2602 for receiving power and/or a network connection from a magnetic connector head. Some examples of electronic device 2600 can include a monitor, a laptop, a smartphone, etc.

In some embodiments, electronic device 2600 includes a radio antenna, such as a Wi-Fi access point, that receives both a power signal and a network signal via connector base 2602. The Wi-Fi access point can connect to a local area network (LAN) or a wide area network (WAN) via connector base 2602, and can connect to multiple nearby wireless devices via the radio antenna. The Wi-Fi access point can relay packets between a LAN or WAN accessible via connector base 2602 and multiple wireless devices accessible via the radio antenna.

The connector head can include a protruding curved surface (e.g., a dome curved surface) with multiple conduction surfaces isolated from each other. Two or more of these conduction surfaces can be used to provide a power signal for an electronic device. In some embodiments, the connector head can include additional conduction surfaces for transmitting and/or receiving data. Connector base 2602 can include a receptacle that also comprises a curved surface (e.g., a concave curved surface) with a plurality of conduction surfaces for receiving a power signal and/or a data signal. The conduction surfaces of connector base 2602 can include connector pins, oriented along positions of the concave curved surface of connector base 2602 that match the conduction surfaces of the connector head's contact surface.

Unlike typical power connectors that require aligning a cable connector to a device's power connector in one or two possible orientations, connector base 2602 and the connector head of the present invention can be coupled in any rotational orientation, and allow the angular and rotational orientation of the connector head on the connector base to change. The user does not need to figure out a current orientation of the connector head for the purpose of connecting (mating) the connector head to the connector base.

The adjustable angular and rotational variations between the connector head and the connector base allows a degree of movement that prevents the connector head from being disconnected from the connector base unintentionally. For example, a laptop can include the connector base as a power jack, and a user can plug in the connector head to the laptop's connector base to recharge the laptop's battery.

FIG. 27 illustrates an exemplary portable computing device 2700 comprising a connector base 2702 in accordance with an embodiment. A user can plug a connector head into connector base 2702 to provide power to computing device 2700. If the user is using computing device 2700 on his or her lap while the connector head is plugged into connector base 2702, the user may accidentally push up or down on the cable of the connector head with his or her lap or arm. Other magnetic connectors that do not allow the connector head to rotate within connector base 2702 may become unplugged when an angular pressure is pushed on the cable near the connector head. However, when such an angular pressure is forced on cable near the curved connector head of the present invention, the connector head will rotate within connector base 2702 without unplugging from connector base 2702. The connector head can still be removed from connector base 2702 when a small outward (pulling) force is applied to the connector head's cable, either by the user that intentionally unplugs the connector head from connector base 2702, or by a person that accidentally trips or pulls on the cable.

FIG. 28A illustrates an exemplary connector head 2800 on a cable 2802 in accordance with an embodiment. Specifically, connector head 2800 can include a magnetic ball receptacle 2804 that may be used with a connector base (e.g., a power jack), such as to plug into any portable electronic device. For example, connector head 2800 can provide a power source, and the connector base can exist on a portable electronic device that receives power from connector head 2800.

FIG. 28B illustrates an exploded view of an exemplary connector head 2850 with a threaded perimeter in accordance with an embodiment. Specifically, the threaded perimeter of connector head 2850 facilitates mating connector head 2850 to a connector base 2852 of a computing device.

For example, connector head 2850 may be a part of a heavy device head (e.g., a heavy pant-tilt-zoom (PTZ) camera head) that may not remain coupled to connector base 2852 when the force of gravity overpowers the magnetic force emitted by the connector base. Hence, the device's connector head 2852 can include a locking ring 2854 comprising a threaded inner surface that screws onto (mates with) the threaded perimeter of connector base 2852. A user can still adjust a rotational orientation of the device while the device is mounted on connector base 2852, without unscrewing locking ring 2854 or causing the device to decouple from connector base 2852.

Moreover, in some embodiments, contact surface 2856 can also include a threaded fastener 2858 for securing contact surface 2856 to a receptacle surface of connector base 2852. For example, connector base 2852 can also include a threaded receptacle (e.g., a threaded hole) into which a user can screw threaded fastener 2858 to secure connector head 2850 onto connector base 2852.

In some embodiments, the threaded perimeter and/or the threaded receptacle of connector base 2852 can provide an electrical contact for connector head 2850. Locking ring 2854 and/or threaded fastener 2858 of connector head 2850 can also include an electrical contact that establishes an electrical connection with the threaded perimeter of connector base 2852. For example, connector head 2850 can receive electrical power from connector base 2852 via at least two of the electrical contacts of connector head 2850: the electrical contact on threaded perimeter 2854; one or more conduction surfaces on a contact surface 2856; and threaded fastener 2858.

Device Head and Connector Base Variation

Figure 29:
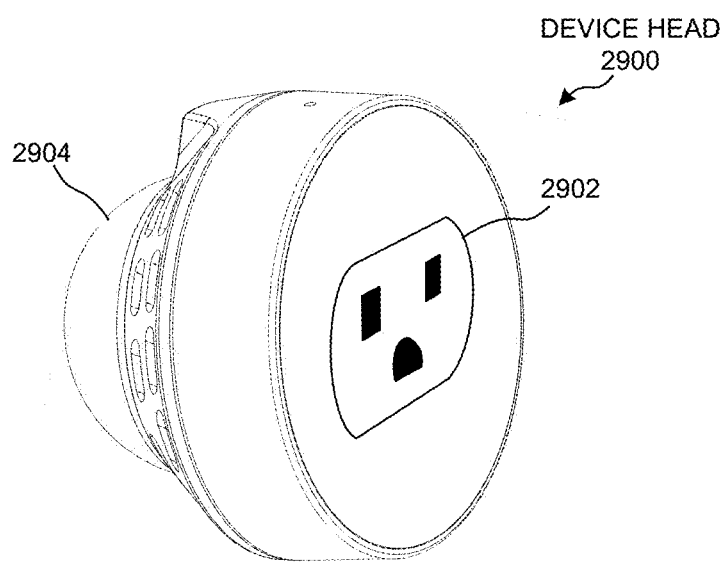
FIG. 29 illustrates an exemplary device head comprising a power socket in accordance with an embodiment.

FIG. 29 illustrates an exemplary device head 2900 comprising a power socket 2902 in accordance with an embodiment. Device head 2900 comprises a contact surface 2904 that fits into (mates with) a receptacle surface of a connector base, and can be rotated without losing a connection to power-carrying pins of the connector base. In some embodiments, power socket 2902 can include a two-prong socket. A user can plug in a typical two-prong plug into power socket 2902 to access power from the connector base. A user can rotate device head 2900 while the mated with the connector base, for example, to untangle a power cable, or to adjust an angle of an electronic component plugged directly into the power socket 2902. In some embodiments, power socket 2902 can include a three-prong socket, which provides a ground connection via the third prong.

Figure 30A:
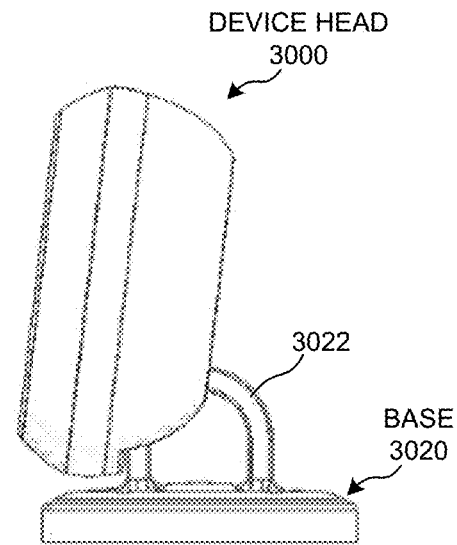
FIG. 30A illustrates an alternative implementation of a device head and a connector base in accordance with an embodiment.

FIG. 30A illustrates an alternative implementation of a device head 3000 and a connector base 3020 in accordance with an embodiment. Mounting base 3020 comprises a rail 3022 on which camera head 3000 can slide. Specifically, rail 3022 is curved along one axis, which allows camera head 3000 to rotate along this axis while sliding along rail 3022. Hence, a user can angle the camera up or down by sliding camera head 3000 along rail 3022.

In some embodiments, rail 3022 comprises a magnetic material that emits a magnetic field. Camera head 3000 can include a curved portion that rests on rail 3022 of mounting base 3020, such that the curved portion includes a magnetically conductive material (e.g., a metal) that reacts to (is attracted to) the electric field emitted by rail 3022. Thus, a user can mount camera head 3000 on mounting base 3020 by resting the curved portion of camera head 3000 on curved rail 3022 of mounting base 3020, at which point the magnetic field emitted by rail 3022 attracts and retains camera head 3000 on rail 3022.

Figure 30B:
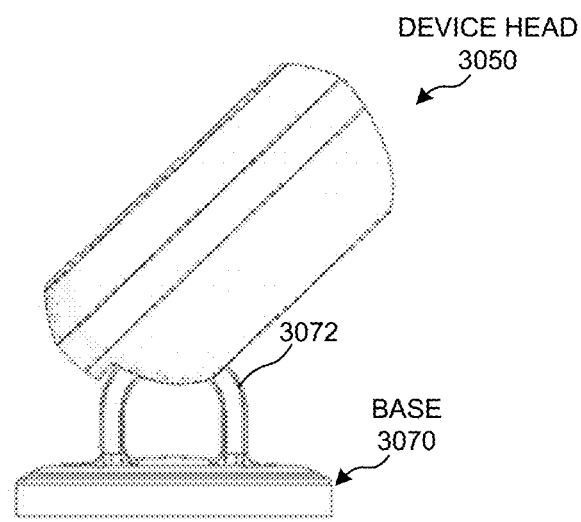
FIG. 30B illustrates a device head with an adjusted orientation while mated with a rail of a connector base in accordance with an embodiment.

FIG. 30B illustrates a device head 3050 with an adjusted orientation while mated with a rail 3072 of a connector base 3070 in accordance with an embodiment. The user can adjust the angle of camera head 3050 by sliding camera head 3050 along rail 3072 while camera head 3050 is mounted on rail 3072. The user can unmount camera head 3050 from mounting base 3070 by pulling on camera head 3050 with sufficient force to overcome the force of the magnetic field on camera head 3050.

In some embodiments, rail 3022 rests on a rotating platform on mounting base 3020. The user can rotate the platform (and thus rail 3022) on mounting base 3020 to adjust a direction at which camera head 3000 is aimed.

Figure 31A:
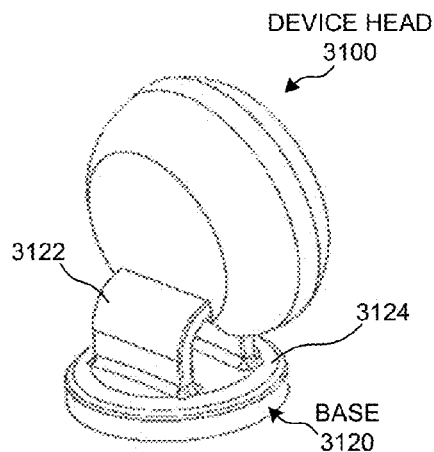
FIG. 31A illustrates an angled view of a camera head and mounting base in accordance with an embodiment.

FIG. 31A illustrates an angled view of a camera head 3100 and mounting base 3120 in accordance with an embodiment. Specifically, mounting base 3120 includes a rotating platform 3124 for panning camera head 3100, and a rail 3122 mounted for tilting camera head 3100. For example, if camera head 3100 is mounted on a wall so that curved axis of rail 3122 runs vertically, the user can tilt camera head 3100 up or down by sliding camera head 3100 along rail 3122. However, if the user wishes to aim the camera to an area not covered by the current rail orientation (e.g., an area to the left or the right of the current orientation), the user can rotate platform 3124 (and rail 3122) to pan camera head 2100 into an orientation that allows camera head 3100 to cover the desired area.

Mounting base 3120 can include, along rail 3122, a set of electrically conductive surfaces that provide power to camera head 3100. In some embodiments, mounting base 3120 can provide a network connection to camera head 3100 over the power signal by modulating the power signal to carry the network signals. In some other embodiments, rail 3122 on mounting base 3122 can also include an additional set of electrically conductive surfaces that provide a network connection to camera head 3100.

Figure 31B:
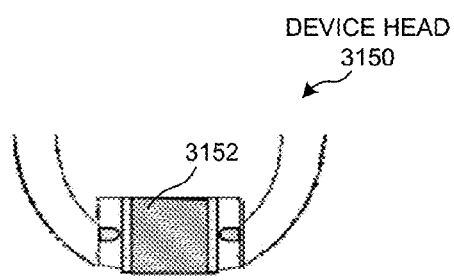
FIG. 31B illustrates a close-up view of a contact on a camera head in accordance with an embodiment.

FIG. 31B illustrates a close-up view of a contact 3152 on a camera head 3150 in accordance with an embodiment. Contact 3152 can include a set of connector pins along the curved portion at the bottom of camera head 3150, arranged in an orientation that matches the electrically conductive surfaces of a rail on a mounting base. When camera head 3150 is mounted on the mounting base, the connector pins on contact 3152 of camera head 3150 come in contact with their corresponding electrical conductive surfaces of the rail on the mounting base, which completes an electrical circuit that allows electrical signals to flow between camera head 3150 and the mounting base.

Figure 32A:
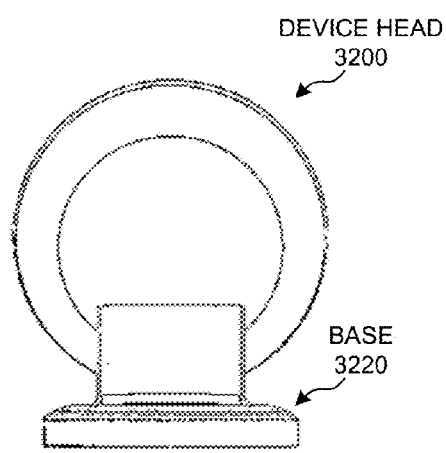
FIG. 32A illustrates a rear view of device head mounted on a mounting base in accordance with an embodiment.

FIG. 32A illustrates a rear view of device head 3200 mounted on a mounting base 3220 in accordance with an embodiment.

Figure 32B:
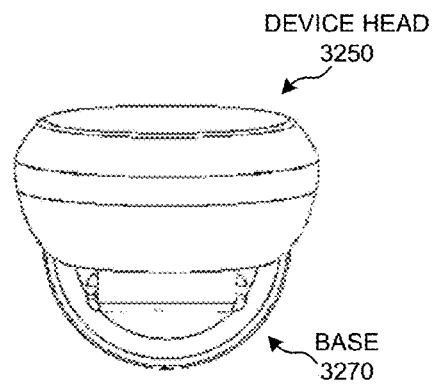
FIG. 32B illustrates a top view of a device head mounted on a mounting base in accordance with an embodiment.

FIG. 32B illustrates a top view of a device head 3250 mounted on a mounting base 3270 in accordance with an embodiment.

Power Adapter with Spool

In some embodiments of the present invention, the connector base can receive power from a power adapter that includes an internal spool for storing an unused segment of a power cable. If the user wishes to extend the power cable, the user can pull the spool out of the power adapter, unwind a desired cable length from the spool, and re-insert the spool back into the power adapter. On the other hand, if the user wishes to shorten the length of the power cable, the user can wind the power cable around the spool until the power cable is of the desired length, and may then re-insert the spool back into the power adapter.

Figure 33A:
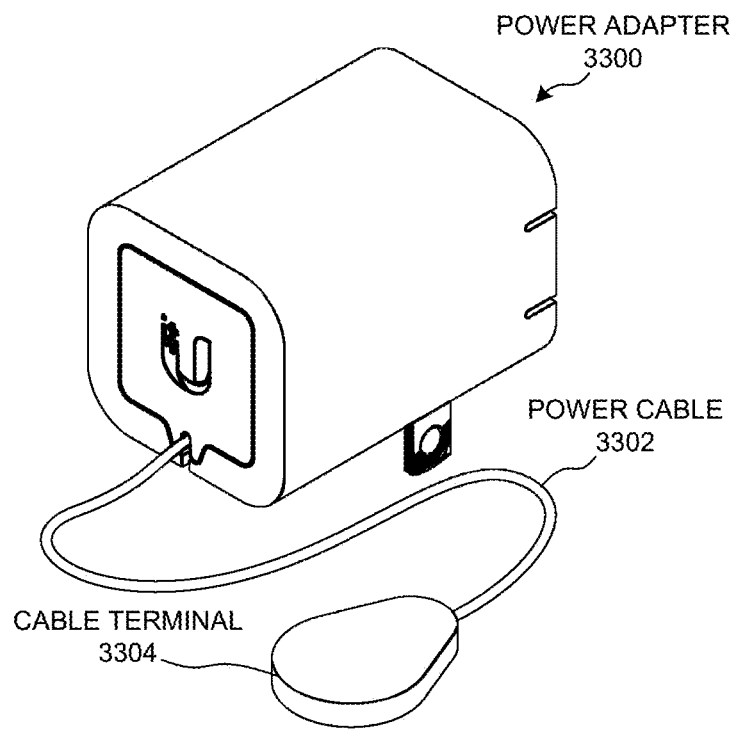
FIG. 33A illustrates a power adapter in accordance with an embodiment.

FIG. 33A illustrates a power adapter 3300 in accordance with an embodiment. Power adapter can include a cable terminal 3304 which may be coupled to a rear face of a connector base (not shown), and can include a power cable 3302 which may carry an electrical power signal from power adapter 3300 to cable terminal 3304. The portion of power cable 3302 external to power adapter 3300 corresponds to a user's desired power cable length. A remaining portion of power cable 3302 is wound around a spool internal to power adapter 3300.

Figure 33B:
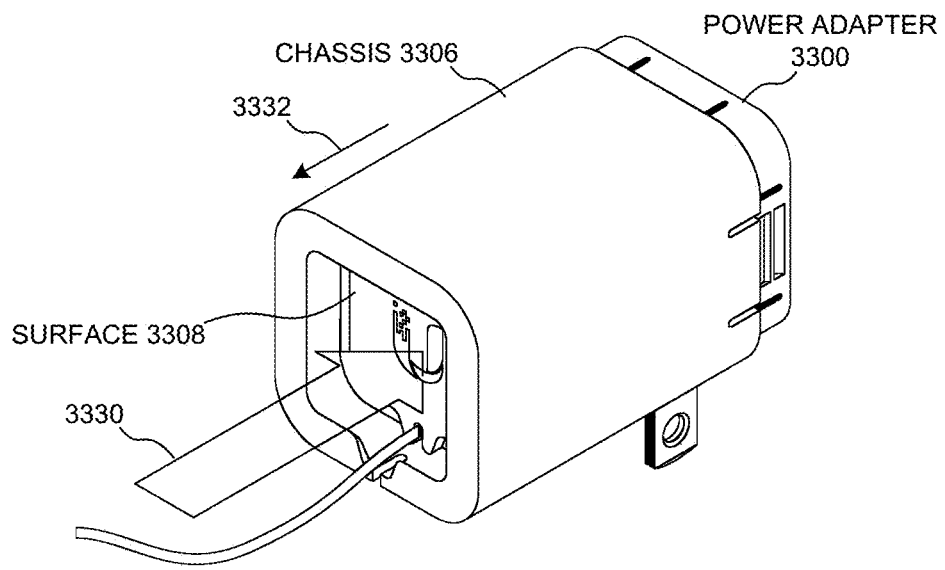
FIG. 33B illustrates a chassis being removed from the power adapter in accordance with an embodiment.

FIG. 33B illustrates a chassis 3306 being removed from power adapter 3300 in accordance with an embodiment.

Specifically, the user can push on a rear surface 3308 of power adapter 3300 in a direction 3330 while sliding chassis 3306 in a direction 3332 to expose the cable spool.

Figure 33C:
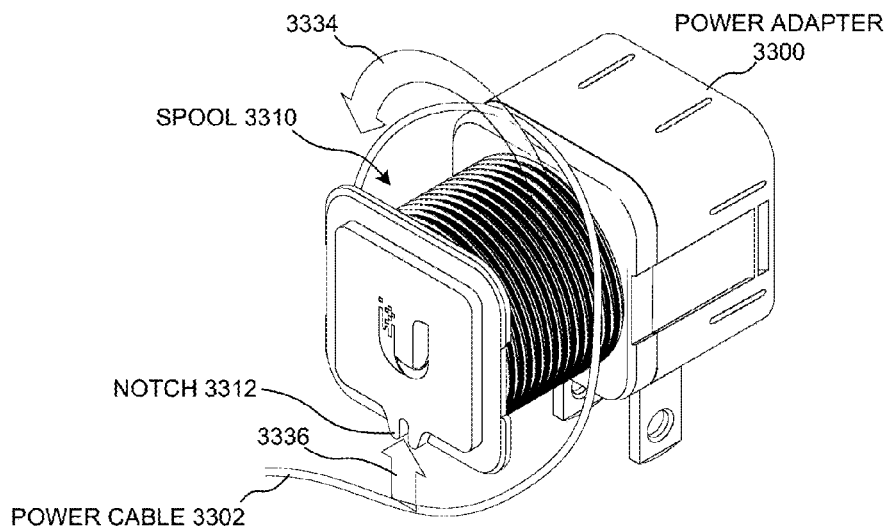
FIG. 33C illustrates a cable spool mounted on a rear section of the power adapter.

FIG. 33C illustrates a cable spool 3310 mounted on a rear section of power adapter 3300. Once spool 3310 is exposed from chassis 3306, the user can extend power cable 3302 by unwinding power cable 3302 from spool 3310 in a counter clock-wise direction 3334. Alternatively, the user can shorten the length of the exposed segment of power cable 3302 by winding power cable 3302 onto spool 3310 in a clock-wise direction. Once the user has extended or shortened the exposed segment of power cable 3302 to the desired length, the user can secure power cable 3302 to spool 3310 by inserting power cable 3302 into a notch 3312 in a direction 3336. The user may then re-insert spool 3310 into chassis 3306, and may couple cable terminal 3304 to a connector base to provide power to the connector base.

Figure 33D:
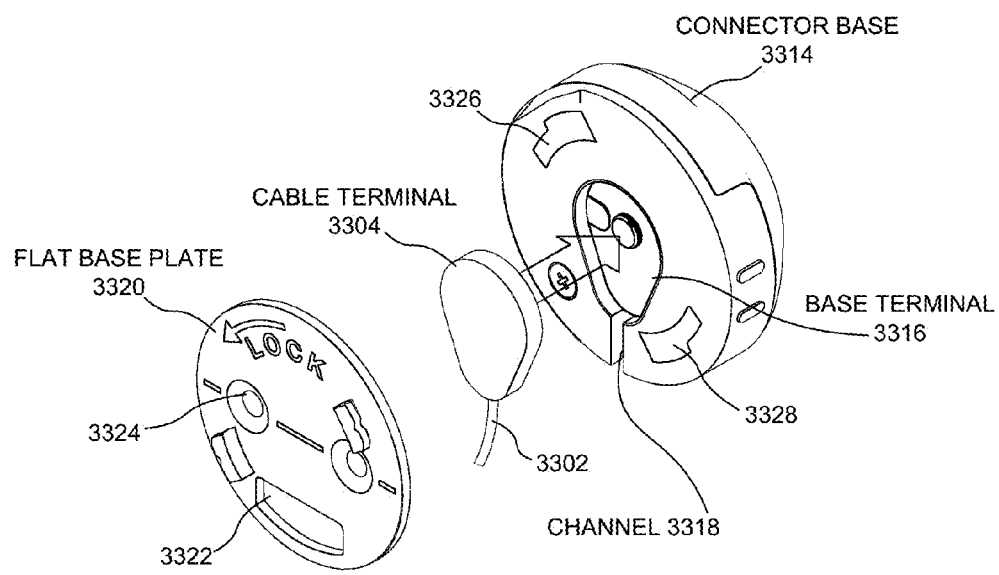
FIG. 33D illustrates a cable terminal coupled to a connector base in accordance with an embodiment.

FIG. 33D illustrates cable terminal 3304 coupled to a connector base 3314 in accordance with an embodiment. Specifically, a first face of cable terminal 3304 that can include at least two contact pads may be coupled to a base terminal 3316 that includes a corresponding set of contact pads on a rear surface of connector base 3314. When cable terminal 3304 is coupled to base terminal 3316, the contact pads of cable terminal 3304 make contact with the corresponding contact pads of base terminal 3316 to complete an electric circuit that may allow an electric power signal to flow from power adapter 3300 to connector base 3314. Moreover, base terminal 3316 and a channel 3318 may be recessed into the rear surface of connector base 3314, which can allow cable terminal 3304 and power cable 3302 to recede past the rear surface of connector base 3314. A user may affix a flat base plate 3320 to the rear surface of connector base 3314 to secure cable terminal 3304 to base terminal 3316.

In some embodiments, the user can use flat base plate to affix connector base 3314 to a flat surface, such as a wall. To do so, the user may first affix flat base plate 3320 to the wall using a mounting tape (not shown) that may adhere flat base plate 3320 to the wall, or may secure flat base plate 3320 to the wall by drilling one or two screws (not shown) through screw holes 3324. Then, the user may secure connector base 3314 to the wall by inserting and securing a set of mounting tabs of flat base plate 3320 into slots 3326 and 3328 of connector base 3314. If the user wishes to hide power cable 3302 after connector base 3314 is mounted on the wall, the user can run power cable 3302 through the wall, and through a cable through-hole 3322 of flat base plate 3320 prior to coupling cable terminal 3304 to base terminal 3316.

Figure 33E:
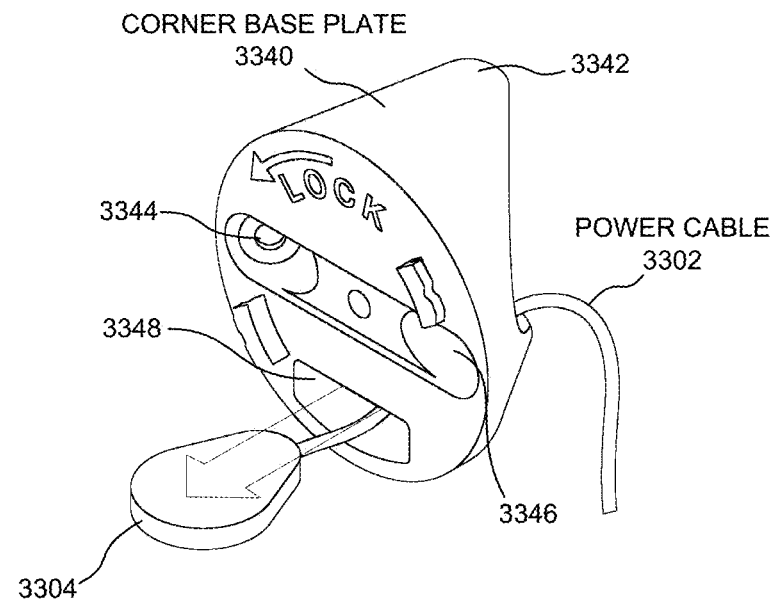
FIG. 33E illustrates a corner base plate in accordance with an embodiment.

FIG. 33E illustrates a corner base plate 3340 in accordance with an embodiment. The user can use corner base plate to affix connector base 3314 to a corner between two surfaces that intersect at a near 90-degree angle, such as a corner between two walls in a room. The user can set an edge 3342 of corner base plate 3340 against the corner, can drill a first screw through a hole 3344 and into the first surface, and can drill a second screw through a hole 3346 and into the second surface. If the user wishes to hide power cable 3302, the user may run power cable 3302 through the wall (e.g., near the corner), and can pass cable terminal 3304 and power cable 3302 through a cable through-hole 3348 of corner base plate 3340 prior to screwing corner base plate 3340 to the two surfaces.

Figure 33F:
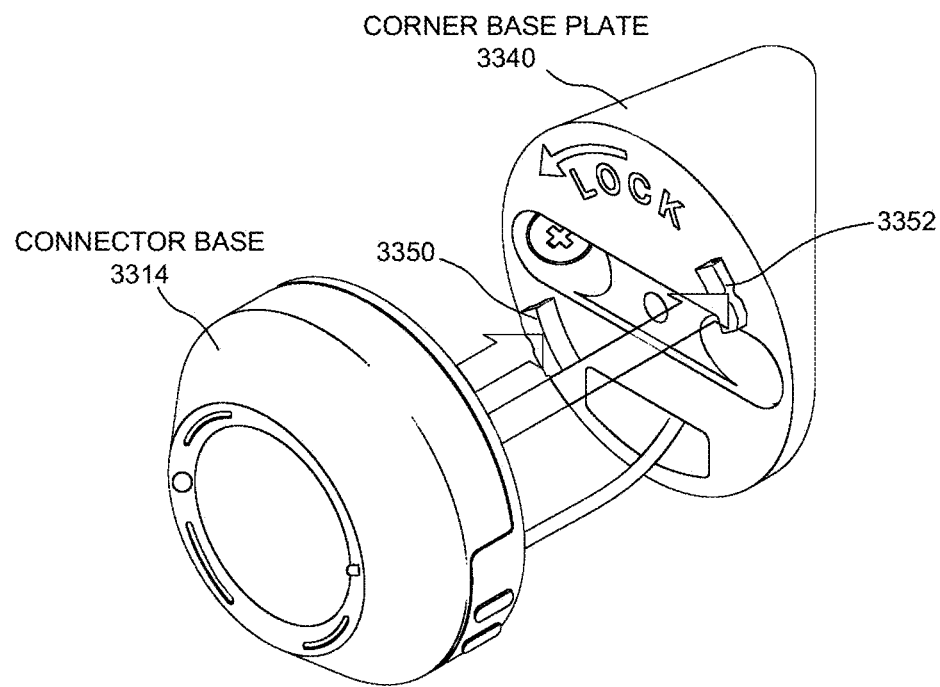
FIG. 33F illustrates the connector base being mounted on the corner base plate in accordance with an embodiment.

FIG. 33F illustrates connector base 3314 being mounted on corner base plate 3340 in accordance with an embodiment. Specifically, the user may secure connector base 3314 to corner base plate 3340 by inserting a set of mounting tabs 3350 and 3352 of corner base plate 3320 into a corresponding set of slots of connector base 3314, and rotating connector base 3314 (e.g., in a counter clock-wise direction) to secure connector base 3314 to corner base plate 3340.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
    a power connector comprising a concave curved receptacle surface that forms a semi-sphere;
    an electronic device comprising a convex curved contact surface that forms a semi-sphere and is configured to mate directly with the concave curved receptacle surface of the power connector;
    a device-coupling mechanism configured to maintain the curved contact surface of the electronic device detachably coupled to the curved receptacle surface of the power connector apparatus, with three degrees of freedom, via a magnetic field; and
    a power-transfer mechanism configured to maintain continuous transfer of power from the power connector to the electronic device through two or more contact points between the convex curved contact surface of the electronic device and the concave curved receptacle surface of the power connector, while the electronic device is reoriented with respect to the power connector.

2. The apparatus of claim 1, wherein the device-coupling mechanism comprises a ball-and-socket joint.

3. The apparatus of claim 1, wherein device-coupling mechanism comprises a magnet or an electromagnet in the power connector that emits a magnetic field; and wherein the device-coupling mechanism further comprises a magnetically sensitive material on the electronic device, wherein the magnetically sensitive material is attracted to the magnetic field emitted by the magnet or electromagnet on the power connector.

4. The apparatus of claim 1, wherein the curved receptacle surface of the power connector forms a concave semi-sphere; and
wherein the curved contact surface of the electronic device forms a convex semi-sphere configured to mate directly with the concave curved receptacle surface of the power connector with matching curvature.

5. The apparatus of claim 1,
wherein the two or more contact points comprise:
at least two conduction surfaces on the receptacle surface, which when in contact with at least two corresponding conduction surfaces on the contact surface of the electronic device, are configured transfer at least the power to the electronic device over at least two corresponding contact pins:
wherein the at least two contact pins remain in contact with the corresponding conduction surfaces, while the electronic device is reoriented; and
wherein the electronic device includes a contact pin configured to receive power or data, and separated from the contact surface by an insulation layer.

6. The apparatus of claim 1, wherein the power-transfer mechanism is further operable to exchange data signals with the electronic device via one or more of:
at least two power conduction surfaces that are operable to transmit and receive data signals on top of a power signal; and
one or more conduction surfaces on the curved receptacle surface operable to exchange standalone data signals with the electronic device.

7. The apparatus of claim 1, further comprising an actuator operable to adjust an orientation of the electronic device relative to the power connector.

8. The apparatus of claim 7, wherein the actuator includes a wheel on the curved receptacle surface of the power connector, and wherein when the electronic device is mounted on the power connector, the wheel is in contact with the curved contact surface of the electronic device.

9. The apparatus of claim 7, wherein the actuator comprises a receptacle-side magnet on the power connector, wherein the receptacle-side magnet emits a magnetic field to attract a device-side magnet of the electronic device.

10. The apparatus of claim 1,
wherein the electronic device comprises a camera;
wherein the device-coupling mechanism is further configured to allow detachment of the first device and attachment and powering of a second electronic device comprising a second convex curved contact surface and of differing functionality from the electronic device; and wherein the second electronic device comprises one or more of:
a camera;
a microphone;
a sound reproduction mechanism; and
a light source.

11. The apparatus of claim 1, wherein the electronic device comprises one or more of:
a wireless radio;
a curved antenna for the wireless radio, wherein the curved antenna contours a perimeter of the curved contact surface of the electronic device; and
a heat sink at least partially surrounded by the curved contact surface of the electronic device.

12. A method, comprising:
detachably coupling an electronic device to a concave curved receptacle surface of a power connector, wherein the electronic device is operable to be rotated with respect to the power connector with at least three degrees of freedom and wherein the electronic device comprises a convex curved contact surface that forms a semi-sphere and is configured to mate directly with the concave curved receptacle surface of the power connector;
maintaining a continuous power supply from the power connector to the electronic device while the electronic device is reoriented with respect to the power connector;
establishing a wireless network connection using a transceiver located in the electronic device;
capturing a video stream using an image sensor located in the electronic device; and
transmitting the video stream using the transceiver through the wireless network to a remotely located device.

13. The method of claim 12, wherein the electronic device is detachably coupled to the power connector through a ball-and-socket joint.

14. The method of claim 12, wherein detachably coupling the electronic device to the power connector involves placing the convex curved contact surface of the electronic device sufficiently close to the concave curved receptacle surface of the power connector to allow a magnetic field from the power connector to attract a magnetically sensitive element of the electronic device.

15. The method of claim 12,
wherein maintaining the continuous power supply to the electronic device involves:
providing power, via at least two electrically isolated contact points between the concave curved receptacle surface of the power connector and the convex curved contact surface of the electronic device, while the electronic device is rotated relative to the power connector via three degrees of freedom; and
wherein the electronic device includes a contact pin configured to receive power or data, and separated from the contact surface by an insulation layer.

16. The method of claim 12, wherein transmitting the video stream comprises:
transmitting a radio frequency (RF) signal through a curved antenna embedded in the electronic device, wherein the radio frequency carries an uninterrupted video stream to the remotely located device over the wireless network connection while the electronic device is rotated relative to the power connector via three degrees of freedom.

17. An apparatus, comprising:
a power connector comprising a concave curved receptacle surface;
an electronic device comprising a convex curved contact surface configured to mate directly with the concave curved receptacle surface of the power connector;
an actuator configured to adjust an orientation of the electronic device relative to the power connector, with three degrees of freedom, while the convex curved contact surface of the electronic device is in contact with the concave curved receptacle surface of the power connector; and a power-transfer mechanism operable to maintain a continuous transfer of power from the power connector to the electronic device, while a mounting angle of the electronic device is adjusted with respect to the power connector.

18. The apparatus of claim 17, wherein the power connector further comprises a device-coupling mechanism that emits a magnetic field to maintain the convex curved contact surface of the electronic device pressed against the concave curved receptacle surface of the power connector apparatus, while an angle of the electronic device changes with respect to the power connector; and wherein the electronic device further comprises a magnetically-sensitive material that is attracted to the magnetic field emitted by the power connector.

19. The apparatus of claim 18, wherein the device-coupling mechanism comprises one or more of:

a magnet; and an electromagnet.

20. The apparatus of claim 17, wherein the concave curved receptacle surface of the power connector and the convex curved contact surface of the electronic device each forms a semi-sphere.

21. The apparatus of claim 17, wherein the actuator includes a wheel on the concave curved receptacle surface of the power connector, and wherein when the electronic device is mounted on the power connector, the wheel is in contact with the convex curved contact surface of the electronic device.

22. The apparatus of claim 17, wherein the actuator comprises a receptacle-side magnet on the power connector, wherein the receptacle-side magnet emits a magnetic field to attract a device-side magnet of the electronic device.

23. The apparatus of claim 17: wherein the power-transfer mechanism comprises:

at least two conduction surfaces on the receptacle surface, which when in contact with at least two corresponding conduction surfaces on the contact surface of the electronic device, are configured transfer power to the electronic device over at least two corresponding contact pins:

wherein the at least two contact pins remain in contact with the corresponding conduction surfaces, while the electronic device is reoriented; and wherein the electronic device includes a contact pin configured to receive power or data, and separated from the contact surface by an insulation layer.

24. The apparatus of claim 17, wherein the electronic device includes one or more of:

a microphone;

a sound reproduction mechanism; and a light source.

25. A method, comprising:

receiving, by an electronic device mounted on a power connector, a command to adjust an orientation of the electronic device with respect to the power connector, wherein a convex curved contact surface of the electronic device is kept in contact with a concave curved receptacle surface of the power connector by a magnetic force;

determining, based on the command, a direction to adjust an orientation of the electronic device; and activating an actuator to adjust the orientation of the electronic device along the determined direction while the electronic device is mounted on the power connector.

26. The method of claim 25, wherein receiving the command involves receiving the command from a remote computing device via a wireless network interface.

27. The method of claim 25, wherein receiving the command involves receiving the command from the power connector via a peer-to-peer communication interface with the power connector.

28. The method of claim 25, wherein the actuator includes a wheel mounted on the electronic device, wherein the wheel is in contact with the receptacle surface of the power connector; and wherein activating the actuator involves rotating the wheel to cause friction between the wheel and the receptacle surface of the power connector to rotate the electronic device.

29. The method of claim 25, wherein the actuator includes a device-side magnet mounted on the electronic device, wherein the device-side magnet emits a magnetic field to attract a receptacle-side magnet of the power connector; and wherein activating the actuator involves adjusting a position of the device-side magnet along the determined direction to cause the electronic device to be repositioned along the determined direction while the magnetic field preserves the device-side magnet's position relative to the receptacle-side magnet.

30. The method of claim 25, wherein the actuator is mounted on the power connector, and wherein activating the actuator involves sending a signal for activating the actuator of the power connector via one or more conductive surfaces of the electronic device.

* * * * *

UNITED STATES PATENT AND TRADEMARK OFFICE
CERTIFICATE OF CORRECTION

Page 1 of 1

PATENT NO. : 9,729,791 B2
APPLICATION NO. : 14/921920
DATED : August 8, 2017
INVENTOR(S) : Gerardo G. Huerta and Ming-Tsung Su It is certified that error appears in the above-identified patent and that said Letters Patent is hereby corrected as shown below:

In the Claims

Claim 5: Column 27, Line 6 should read "configured to transfer".

Claim 23: Column 29, Line 6 should read "configured to transfer".

Signed and Sealed this
Ninth Day of January, 2018

Joseph Matal
*Performing the Functions and Duties of the
Under Secretary of Commerce for Intellectual Property and
Director of the United States Patent and Trademark Office*